(12) United States Patent
Wilson et al.

(10) Patent No.: US 12,427,826 B1
(45) Date of Patent: Sep. 30, 2025

(54) CONTROL APPARATUS FOR LIFT AXLE/SUSPENSION SYSTEMS OF HEAVY-DUTY VEHICLES

(71) Applicant: Hendrickson USA, L.L.C., Schaumburg, IL (US)

(72) Inventors: Matt J. Wilson, Canal Fulton, OH (US); Jesse W. Cervantez, Rocky Mount, VA (US); Shawn M. Dinger, North Canton, OH (US); Nicholas R. Barbieri, Canton, OH (US); Jared A. Haney, East Sparta, OH (US)

(73) Assignee: Hendrickson USA, L.L.C., Schaumburg, IL (US)

( * ) Notice: Subject to any disclaimer, the term of this patent is extended or adjusted under 35 U.S.C. 154(b) by 0 days.

(21) Appl. No.: 19/077,256

(22) Filed: Mar. 12, 2025

Related U.S. Application Data

(60) Provisional application No. 63/567,610, filed on Mar. 20, 2024.

(51) Int. Cl.
*B60G 17/052* (2006.01)
*B60G 9/02* (2006.01)
(Continued)

(52) U.S. Cl.
CPC ........... *B60G 17/0521* (2013.01); *B60G 9/02* (2013.01); *B60G 15/12* (2013.01); *B60G 17/00* (2013.01);
(Continued)

(58) Field of Classification Search
CPC ...... B60G 17/0521; B60G 9/02; B60G 15/12; B60G 17/00; B60G 2200/326;
(Continued)

(56) References Cited

U.S. PATENT DOCUMENTS

| 4,219,042 A | 8/1980 | St. Laurent, Jr. |
| 4,944,526 A | 7/1990 | Eberling |

(Continued)

FOREIGN PATENT DOCUMENTS

| EP | 0950602 | 5/2005 |
| EP | 2502808 | 9/2012 |
| WO | 2014181160 | 11/2014 |

OTHER PUBLICATIONS

Hendrickson Technical Bulletin—Lift Axle Control Valve Installation & Calibration, Revision F, Nov. 2024.
(Continued)

*Primary Examiner* — Toan C To
(74) *Attorney, Agent, or Firm* — Dureska & Moore, LLC; David P. Dureska; Benjamin J. Chojnacki

(57) ABSTRACT

A control apparatus for heavy-duty vehicle lift axle/suspension systems, the control apparatus comprising a source of fluid pressure, a primary controller, and a secondary controller. The primary controller is located remote from the lift axle/suspension system. The secondary controller is located proximate to the lift axle/suspension system and the source of fluid pressure and is in fluid communication with the primary controller, the source of fluid pressure, and at least one lift bag and at least one air spring of the lift axle/suspension system. The secondary controller includes a pilot-operated poppet assembly and a discrete or integrated relay valve assembly wherein the primary controller transmits at least a pneumatic pilot signal to the secondary controller in order to selectively inflate and deflate the at least one air spring and the at least one lift bag to selectively control and maintain the extension and retraction of the lift axle/suspension system.

50 Claims, 11 Drawing Sheets

(51) Int. Cl.
*B60G 15/12* (2006.01)
*B60G 17/00* (2006.01)

(52) U.S. Cl.
CPC .... *B60G 2200/326* (2013.01); *B60G 2202/30* (2013.01); *B60G 2204/62* (2013.01); *B60G 2500/104* (2013.01); *B60G 2500/30* (2013.01); *B60G 2600/182* (2013.01); *B60G 2800/162* (2013.01); *B60G 2800/914* (2013.01); *B60G 2800/916* (2013.01)

(58) Field of Classification Search
CPC ............ B60G 2202/30; B60G 2204/62; B60G 2500/104; B60G 2500/30; B60G 2600/182; B60G 2800/162; B60G 2800/914; B60G 2800/916
See application file for complete search history.

(56) References Cited

U.S. PATENT DOCUMENTS

| | | | |
|---|---|---|---|
| 5,018,755 A | 5/1991 | McNeilus et al. | |
| 5,333,645 A | 8/1994 | Galazin | |
| 6,007,078 A * | 12/1999 | Gottschalk | B60G 11/27 280/81.6 |
| 6,240,339 B1 * | 5/2001 | von Mayenburg | B60G 17/0523 701/72 |
| 6,293,570 B1 * | 9/2001 | Gottschalk | B60G 7/02 280/86.751 |
| 6,572,124 B2 | 6/2003 | Mlsna et al. | |
| 6,845,989 B2 | 1/2005 | Fulton et al. | |
| 7,568,710 B2 | 8/2009 | Ramsey | |
| 7,735,516 B2 | 6/2010 | Morris | |
| 7,841,608 B2 | 11/2010 | Morris et al. | |
| 8,047,551 B2 | 11/2011 | Morris et al. | |
| 8,434,773 B2 | 5/2013 | Morris et al. | |
| 8,528,611 B2 | 9/2013 | Wilson et al. | |
| 8,973,633 B2 | 3/2015 | Wilson et al. | |
| 9,776,677 B2 * | 10/2017 | Yakimishyn | B60G 11/27 |
| 10,450,016 B2 * | 10/2019 | Smith | B62D 61/12 |
| 11,712,938 B1 * | 8/2023 | Klein | B62D 7/144 280/86.5 |
| 12,145,416 B2 * | 11/2024 | Jeyakar M R | B60T 17/02 |
| 2003/0151222 A1 * | 8/2003 | Sutton | B62D 61/125 280/86.5 |
| 2005/0269753 A1 * | 12/2005 | Geiger | B60G 11/27 267/64.27 |
| 2009/0079146 A1 | 3/2009 | Stahl et al. | |
| 2019/0337349 A1 | 11/2019 | Delorenzis et al. | |

OTHER PUBLICATIONS

Hendrickson Owner's Manual—LC Auxiliary Lift Axle Control Kits, Revision C, Apr. 2022.

* cited by examiner

CONTROL APPARATUS FOR LIFT AXLE/SUSPENSION SYSTEMS OF HEAVY-DUTY VEHICLES

CROSS-REFERENCE TO RELATED APPLICATION

This application claims the benefit of U.S. Patent Application Ser. No. 63/567,610, filed Mar. 20, 2024.

BACKGROUND

Field of the Invention

The invention relates generally to the art of axle/suspension systems. In particular, the invention relates to lift assemblies for air-ride, beam-type axle/suspension systems of heavy-duty vehicles. More particularly, the invention is directed to a control system for heavy-duty vehicle lift axle/suspension systems that incorporates a poppet valve assembly and a relay valve assembly, or a poppet module housing interchangeable cartridge valves and a separate relay module housing a one-to-one relay valve, that cooperate to provide increased flexibility and versatility with fewer components, relatively faster and more accurate operation, and reduced fluid consumption, thereby reducing wear on components and increasing service-life.

Background Art

The use of air-ride, beam-type axle/suspension systems in heavy-duty vehicles is well-known. For the purposes of clarity and convenience, reference is made to a heavy-duty vehicle with the understanding that such reference includes trucks, tractor-trailers and semi-trailers, trailers, and the like. Although axle/suspension systems can be found in widely varying structural forms, the various structures are generally similar in that each axle/suspension system typically includes a pair of suspension assemblies. The suspension assemblies are typically connected directly to a primary frame of the heavy-duty vehicle or a subframe supported by the primary frame. For those heavy-duty vehicles that support a subframe, the subframe can be non-movable or movable, the latter being commonly referred to as a slider box, slider subframe, slider undercarriage, secondary slider frame, or bogey.

Each suspension assembly of an axle/suspension system includes a longitudinally-extending elongated beam extending forwardly or rearwardly relative to the front of the heavy-duty vehicle, thus defining what are typically referred to as leading- or trailing-arm axle/suspension systems, respectively. However, for the purpose of clarity and conciseness, it is to be understood that the term trailing-arm, as used herein, encompasses beams extending either forwardly or rearwardly with respect to the front end of the heavy-duty vehicle. Each beam is typically located adjacent to and below a respective one of a pair of spaced-apart, longitudinally-extending main members and one or more cross members that form the frame or subframe of the heavy-duty vehicle. For the purpose of clarity and conciseness, reference herein will be made to main members with the understanding that such reference includes main members of primary frames, movable subframes, and non-movable subframes. Each beam is pivotally connected at one of its ends to a hanger, which is attached to and extends from a respective one of the main members of the heavy-duty vehicle. An axle extends transversely between, and typically is connected to, the beams of the pair of suspension assemblies at a selected location from about the mid-point of each beam to the end of the beam opposite its pivotal connection end. A ride air spring is typically connected to, and extends between the beam end opposite the pivotal connection end and a respective one of the main members. A brake system, a pair of wheel end assemblies, and, optionally, one or more shock absorbers are also mounted on the axle/suspension system.

Axle/suspension systems may also include structure that can retract or lift the axle, and thus, raise the associated suspension assemblies of the axle/suspension system, preventing the wheels from engaging the ground. Axle/suspension systems that employ such lift axle/suspension assemblies, commonly referred to as lift axle/suspension systems, are typically paired or grouped with non-lift axle/suspension systems, commonly referred to as primary axle/suspension systems. Lift axle/suspension systems generally incorporate one or more air chambers or lift bags that act on the beams of the lift axle/suspension assemblies to raise the beams. As a result, the connected axle and the associated wheels are lifted and can be maintained in a raised position, preventing the associated wheels from contacting the ground.

The amount of cargo that a heavy-duty vehicle may carry is governed by local, state, and/or national road and bridge laws that limit the maximum load that a heavy-duty vehicle may carry as well as the maximum load that may be supported by individual axles of the heavy-duty vehicle. Thus, lift axle/suspension systems are typically raised when the vehicle load is less than the load capacity of the primary axle/suspension systems in order to promote fuel savings or when greater maneuverability of the heavy-duty vehicle is desired. In addition, raising lift axle/suspension systems reduces wear and increases the service-life of the lifted axle and associated wheels and may also result in toll savings because toll costs are often determined based on the number of axles with wheels in contact with the ground.

Different types of prior art pneumatic or electro-pneumatic control systems have been utilized to operate lift axle/suspension systems, depending on the application and end-user requirements. More specifically, the type of prior art control system selected is influenced by federal, state, and local government regulations; the type of cargo, such as whether the load is fixed or must be shared across the axle/suspension systems; the operation of the lift axle/suspension system, such as the default state; vehicle configuration; and safety concerns. Most prior art control systems for lift axle/suspension systems manage air pressure in the ride air springs by either directional control or relay control. Prior art control systems utilizing directional control typically direct delivery pressure from a remote source of fluid pressure through a primary controller, such as a height control valve or, alternatively, a regulator for establishing a fixed pressure, to the ride air springs. Prior art control systems utilizing directional control can typically accommodate a variety of applications, such that most lift axle/suspension systems use some form of a directional controller. Prior art control systems utilizing relay control direct delivery pressure from a local source of fluid pressure, such as a reservoir, to the ride air springs through a secondary controller, such as a relay valve, in response to a control pressure signal generated by a primary controller.

Prior art lift axle/suspension control systems, while generally performing adequately, may have certain disadvantages, drawbacks, and limitations. For example, the primary controller, and often the source of fluid pressure, in prior art control systems utilizing directional control are generally remote from the ride air springs. As a result, such prior art control systems potentially cause relatively slow rates of inflation and deflation of the ride air springs that are proportional to the distance between the control system and the air springs. Thus, raising and lowering of the lift axle/ suspension system may potentially be relatively slow. Prior art control systems utilizing relay control typically provide relatively faster operation than prior art control systems utilizing directional control because the control pressure signal from the primary controller can be transmitted quickly to the relay valve and because the source of fluid pressure is local or proximate to the lift axle/suspension system. However, the relay valves of prior art control systems utilizing relay control typically experience hysteresis due to seal drag and/or compression. As a result, the output pressure of the relay valves may potentially vary relative to the control signal pressure, which causes variation in the load distributed to the lift axle/suspension system. Thus, prior art control systems utilizing relay control are not considered suitable for heavy-duty vehicle applications requiring the lift axle/suspension system to share the load equally with the primary axle/suspension systems. Moreover, the relay valves typically react to transient surges in the pressure of the control signal as well as in the delivery pressure, such as those caused by jounce and rebound events of the air spring. As a result, prior art control systems utilizing relay control may potentially exhibit increased inflation and deflation activity that may cause increased fluid consumption, increasing wear and decreasing the service-life of components of the control systems, such as compressors and the like, thereby increasing maintenance down-time and costs.

Thus, there is a need in the art for a control apparatus for lift axle/suspension systems that has fewer components while providing increased versatility and compatibility with most heavy-duty vehicle lift axle/suspension applications, relatively fast and more accurate operation for quicker retraction and extension of lift axle/suspension systems as well as improved control of air spring inflation, and reduced fluid consumption to reduce wear and increase the service-life of the components.

BRIEF SUMMARY OF THE INVENTION

Objectives of the present invention include providing a control apparatus for lift axle/suspension systems that has fewer components and increased versatility and compatibility with most heavy-duty lift axle/suspension applications.

A further objective of the present invention is to provide a control apparatus for lift axle/suspension systems that has relatively fast and more accurate operation.

Yet another objective of the present invention is to provide a control apparatus for lift axle/suspension systems that has reduced fluid consumption.

These objectives and advantages are obtained by the control apparatus for heavy-duty vehicle lift axle/suspension systems, according to the present invention, the control apparatus comprising a source of fluid pressure, a primary controller, and a secondary controller. The primary controller is located remote from the lift axle/suspension system. The secondary controller is located proximate to the lift axle/suspension system and the source of fluid pressure and is in fluid communication with the primary controller, the source of fluid pressure, and a lift bag and an air spring of the lift axle/suspension system. The secondary controller includes a pilot-operated poppet assembly and a relay valve assembly. The primary controller transmits a pneumatic pilot signal to the secondary controller in order to selectively inflate and deflate the air spring and lift bag to selectively control and maintain the extension and retraction of the lift axle/suspension system.

BRIEF DESCRIPTION OF THE SEVERAL VIEWS OF THE DRAWINGS

The preferred embodiments of the present invention, illustrative of the best mode in which Applicant has contemplated applying the principles, is set forth in the following description, shown in the drawings, and particularly and distinctly pointed out and set forth in the appended claims.

Similar reference characters refer to similar parts throughout.

DESCRIPTION OF THE PREFERRED EMBODIMENT

Figure 1:
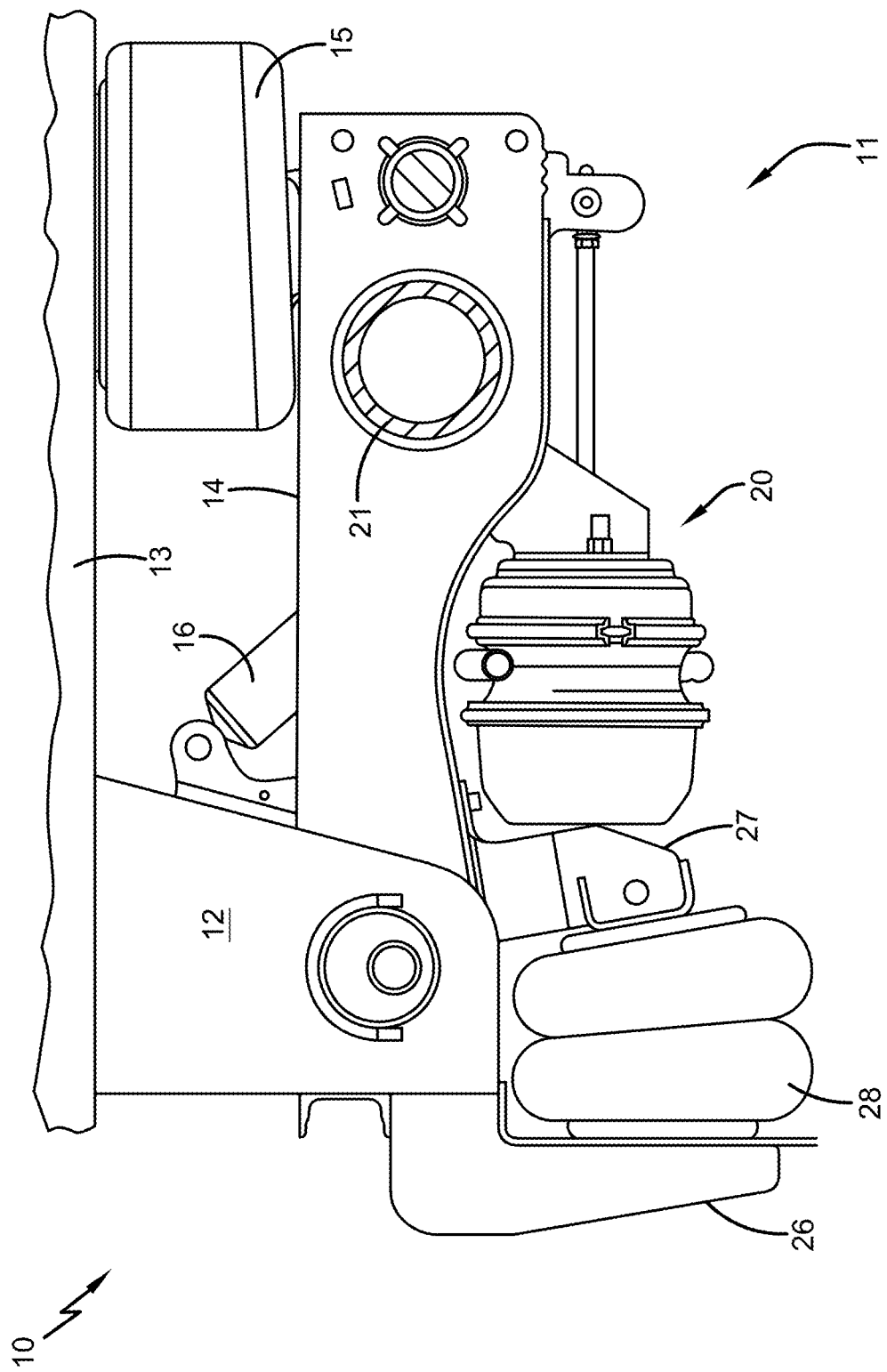
FIG. 1 is an elevational view, partially in section, of a lift axle/suspension assembly, showing the lift axle/suspension assembly without wheel end assemblies.

An exemplary embodiment control apparatus 50 (FIG. 2A-C), according to the present invention, may be utilized with a lift axle/suspension system, such as lift axle/suspension system 10 (FIG. 1) (partially shown). In particular, lift axle/suspension system 10 may include a pair of transversely-spaced, mirror-image lift axle/suspension assemblies 11 (only one shown). Because lift axle/suspension assemblies 11 are mirror images of one another, and for the sake of clarity and conciseness, only one of the lift axle/ suspension assemblies will be described below.

Lift axle/suspension assembly 11 includes a longitudinally-extending beam 14 pivotally connected at one end to a hanger 12 attached to a main member 13 of the heavy-duty vehicle. An axle 21 is connected to and extends transversely between the ends of respective beams 14 opposite the pivotal connection. A pair of wheel end assemblies (not shown), having respective wheels and tires, is rotatably mounted by respective spindles (not shown) on axially opposite ends of axle 21. An air spring 15 may be mounted on lift/axle suspension assembly 11 and extends between beam 14 and main member 13. Lift axle/suspension assembly 11 may also include a shock absorber 16 and a brake system 20. In addition, lift axle/suspension assembly 11 may include a lift support member 26 mounted on and extending downwardly from hanger 12. Similarly, a bracket 27 may be mounted on and extend downwardly from beam 14. An elastomeric lift chamber or lift bag 28 may be attached to and extend between bracket 27 and support member 26.

Control apparatus 50, according to the present invention, controls the delivery of fluid flow to air spring 15 and lift bag 28 of each lift axle/suspension assembly 11. In particular, control apparatus 50 includes a primary controller 80, a secondary controller 100, and a source of fluid pressure 106.

More particularly, primary controller 80 may be any suitable type of primary controller having any suitable interface for an operator of the heavy-duty vehicle as well as a regulator (not shown), height control valve (not shown), pressure gauge (not shown), and/or electric switch (not shown). Primary controller 80 may be in a location that is remote from lift axle/suspension system 10, proximate to the cab of the heavy-duty vehicle, and in fluid communication with secondary controller 100. Primary controller 80 may have a number of configurations such that fluid communication between primary controller 80 and secondary controller 100 may vary depending upon the configuration of the primary controller.

Generally, primary controller 80 may deliver a pilot signal or fluid flow to secondary controller 100 through any suitable means, such as a pilot conduit 81 (FIG. 2A-C) in order to control and/or maintain the inflation and/or deflation of air spring 15 and lift bag 28, thereby controlling and/or maintaining the raising or retraction and/or the lowering or extension of lift axle/suspension assembly 11. Primary controller 80 may also provide a separate regulating control signal through a conduit 82 (FIG. 2A) in fluid communication with secondary controller 100 to establish a particular fluid pressure within air spring 15 of lift axle/suspension assembly 11. Alternatively, and with particular reference to FIG. 2B, primary controller 80 may only provide a regulating signal through conduit 81 to secondary controller 100 to control and/or maintain the inflation and/or deflation of air spring 15 and lift bag 28 as well as to establish a particular fluid pressure within air spring 15. In the alternate, and with particular reference to FIG. 2C, primary controller 80 may be in fluid communication with and send a pilot signal to secondary controller 100 through conduit 81, as described above. However, in this configuration, a separate heavy-duty vehicle height control valve 89 may be in fluid communication with, and send a control signal or fluid flow to, secondary controller 100 through a conduit 92 to establish a particular fluid pressure within air spring 15.

Secondary controller 100 of control apparatus 50 may be in a location that is remote to primary controller 80 and proximate to lift axle/suspension system 10 and source of fluid pressure 106. Secondary controller 100 may be in fluid communication with lift bag 28 and air spring 15 in order to facilitate delivery of fluid flow from source of fluid pressure 106 to the lift bag and air spring and exhaust fluid pressure from the lift bag and air spring. As a result, the location of secondary controller 100 and source of fluid pressure 106 proximate to lift axle/suspension system 10 enables relatively faster extension and/or retraction of each lift axle/suspension assembly 11.

Figure 3A:
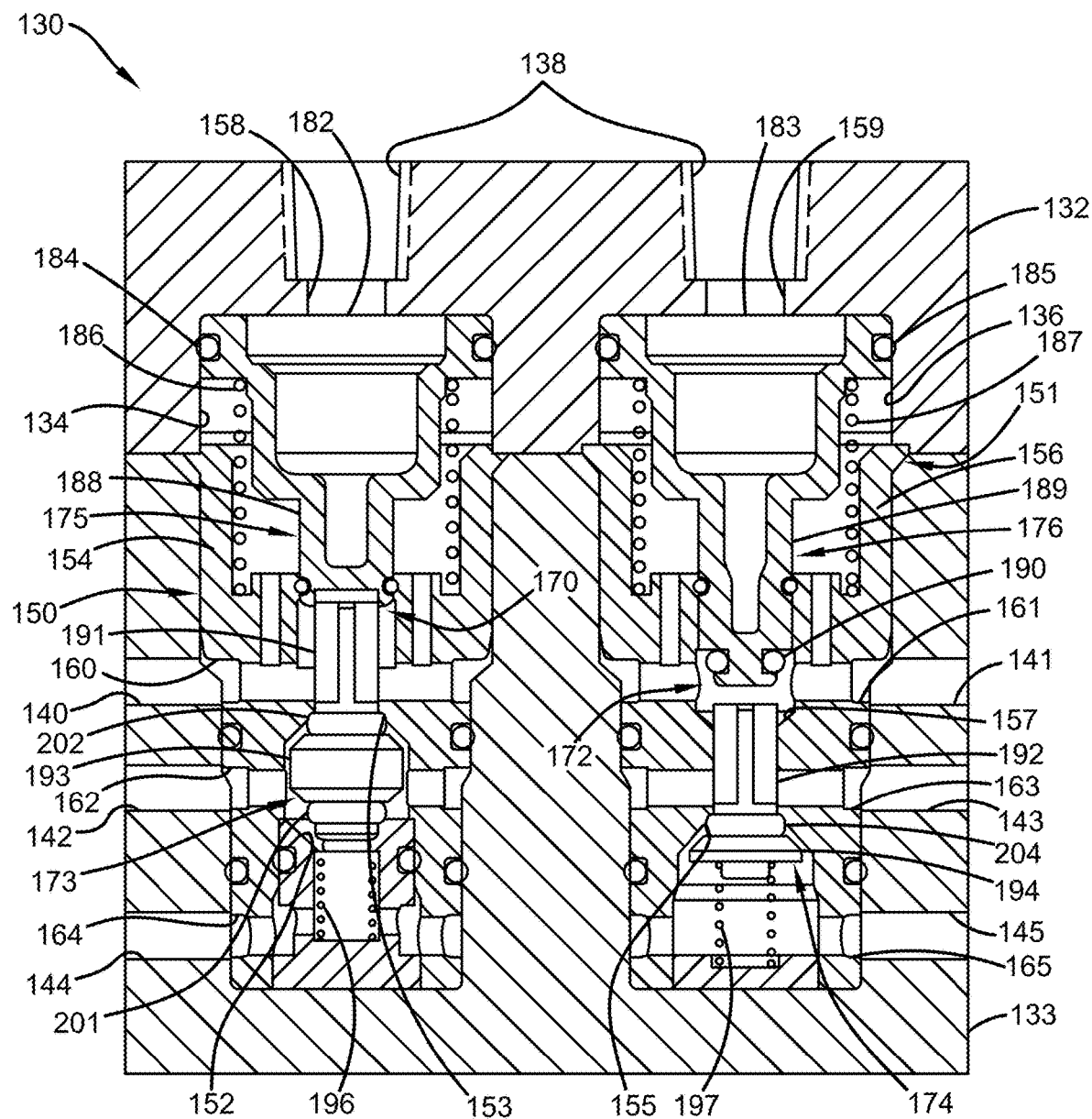
FIG. 3A is an elevational view, in section, of the poppet module of the exemplary control apparatus, according to the present invention, shown in FIGS. 2A-C, showing the cartridge valves in an unpiloted state.
Figure 3B:
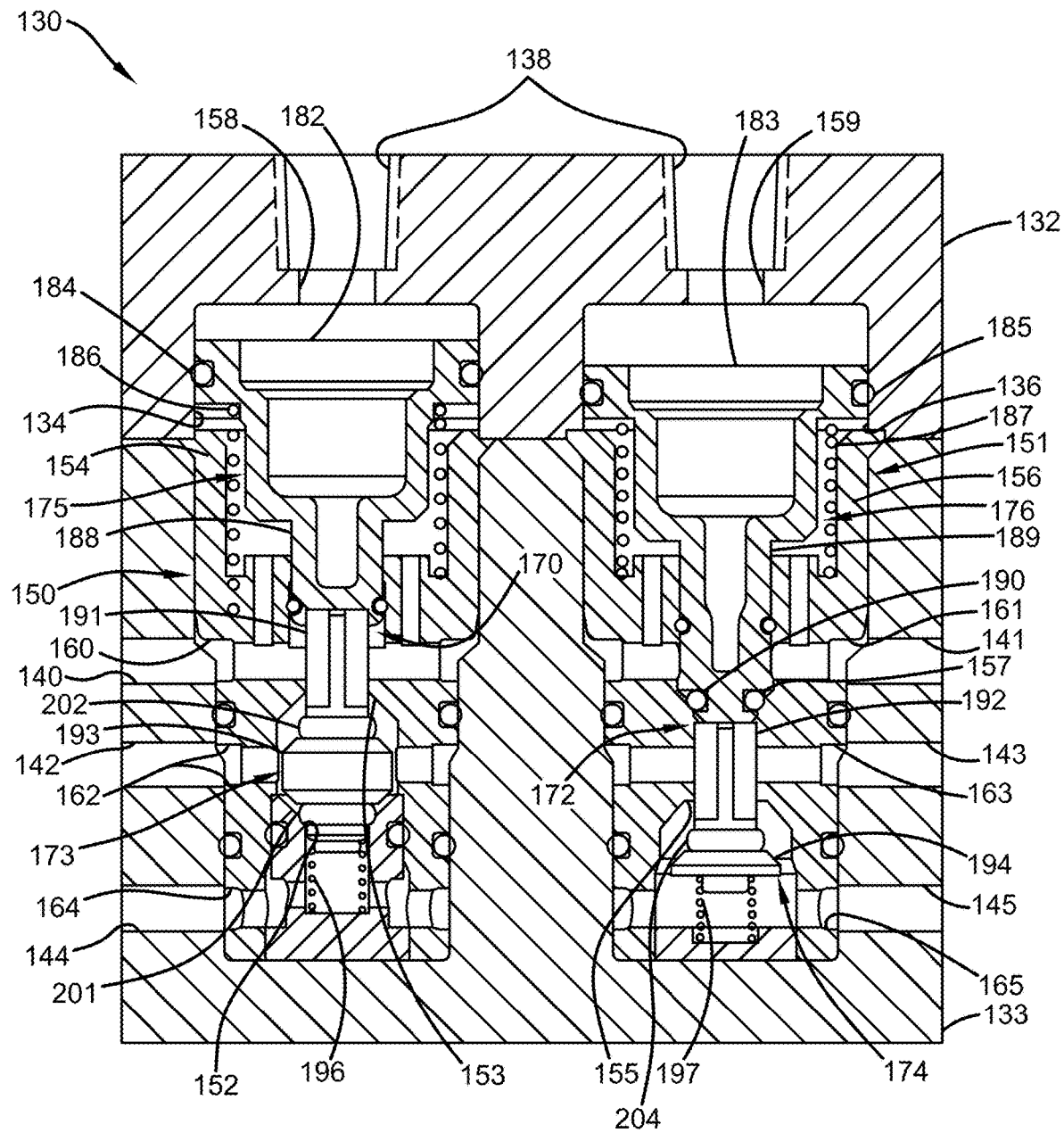
FIG. 3B is an elevational view, in section, of the poppet module shown in FIG. 3A, showing the cartridge valves in a piloted state.
Figure 4:
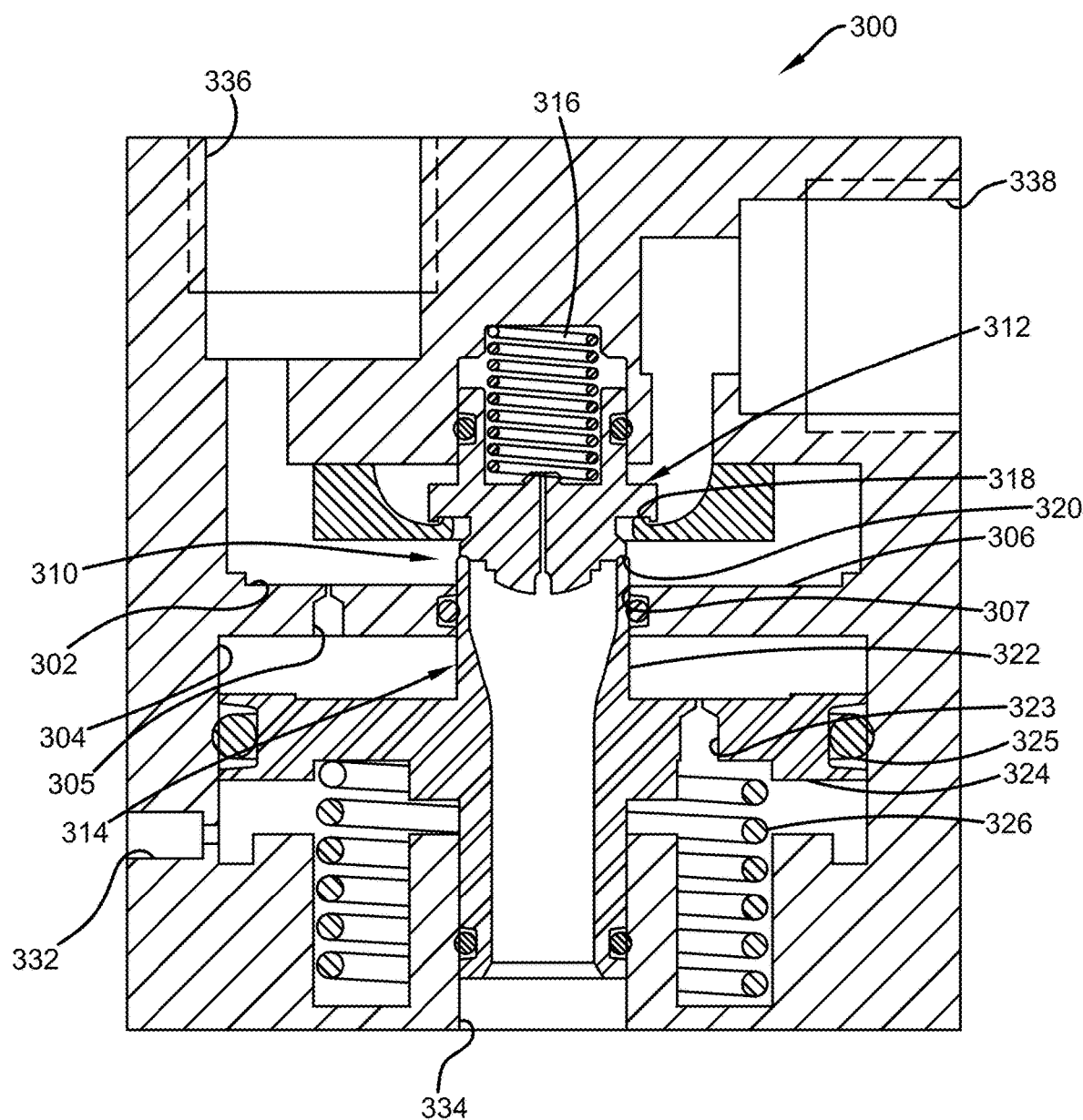
FIG. 4 is an elevational view, in section, of the relay module of the exemplary embodiment control apparatus, according to the present invention, shown in FIGS. 2A-C.
Figure 5:
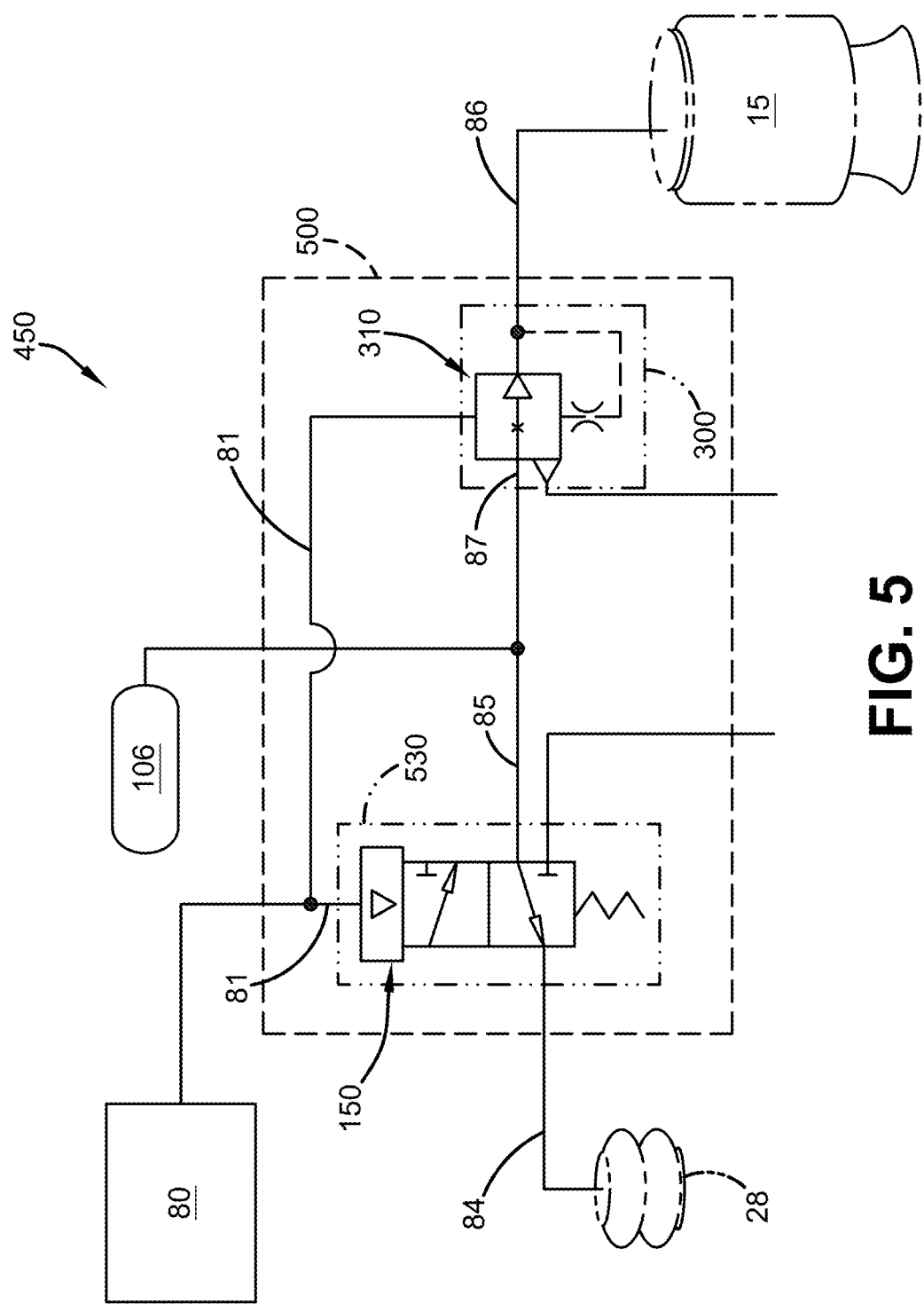
FIG. 5 is a schematic view of another exemplary embodiment control apparatus, according to the present invention, utilized with the lift axle/suspension assembly shown in FIG. 1.

In accordance with an important aspect of the present invention, and with particular reference to FIGS. 3A-4, secondary controller 100 includes a poppet module 130 and a separate relay module 300. Poppet module 130 may be formed as a two-piece structure using any suitable material, such as metal or plastic, using any suitable method, such as extrusion. More specifically, poppet module 130 may include an upper portion 132 and a lower portion 133 having a pair of separate, parallel pockets or chambers 134, 136 formed within and extending at least partially between the upper and lower portions. Upper and lower portions 132, 133 of poppet module 130 may be operatively connected to each other or mechanically engaged using any suitable means, such as fasteners (not shown).

Figure 2A:
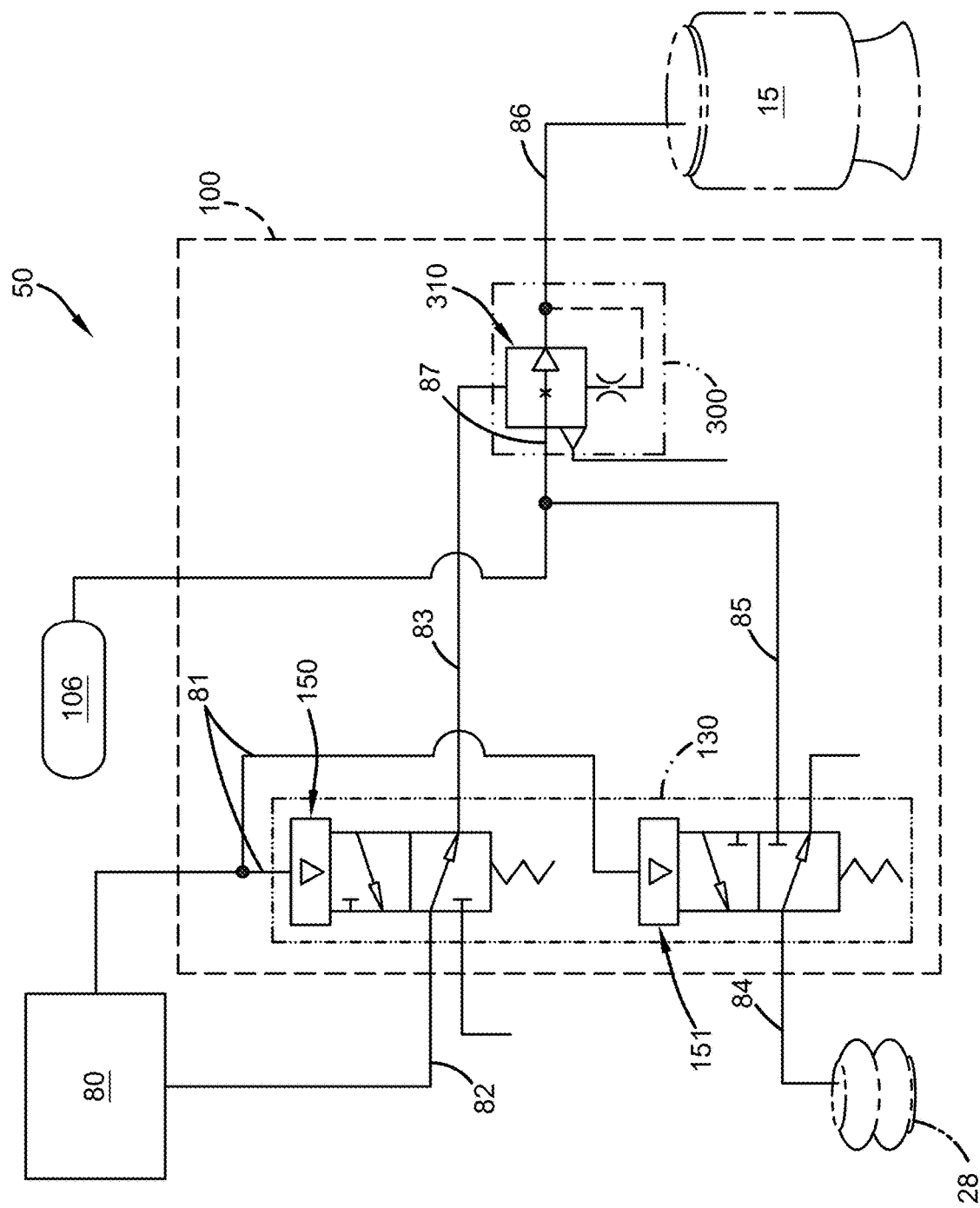
FIG. 2A is a schematic view of an exemplary embodiment control apparatus, according to the present invention, utilized with the lift axle/suspension assembly shown in FIG. 1.
Figure 2B:
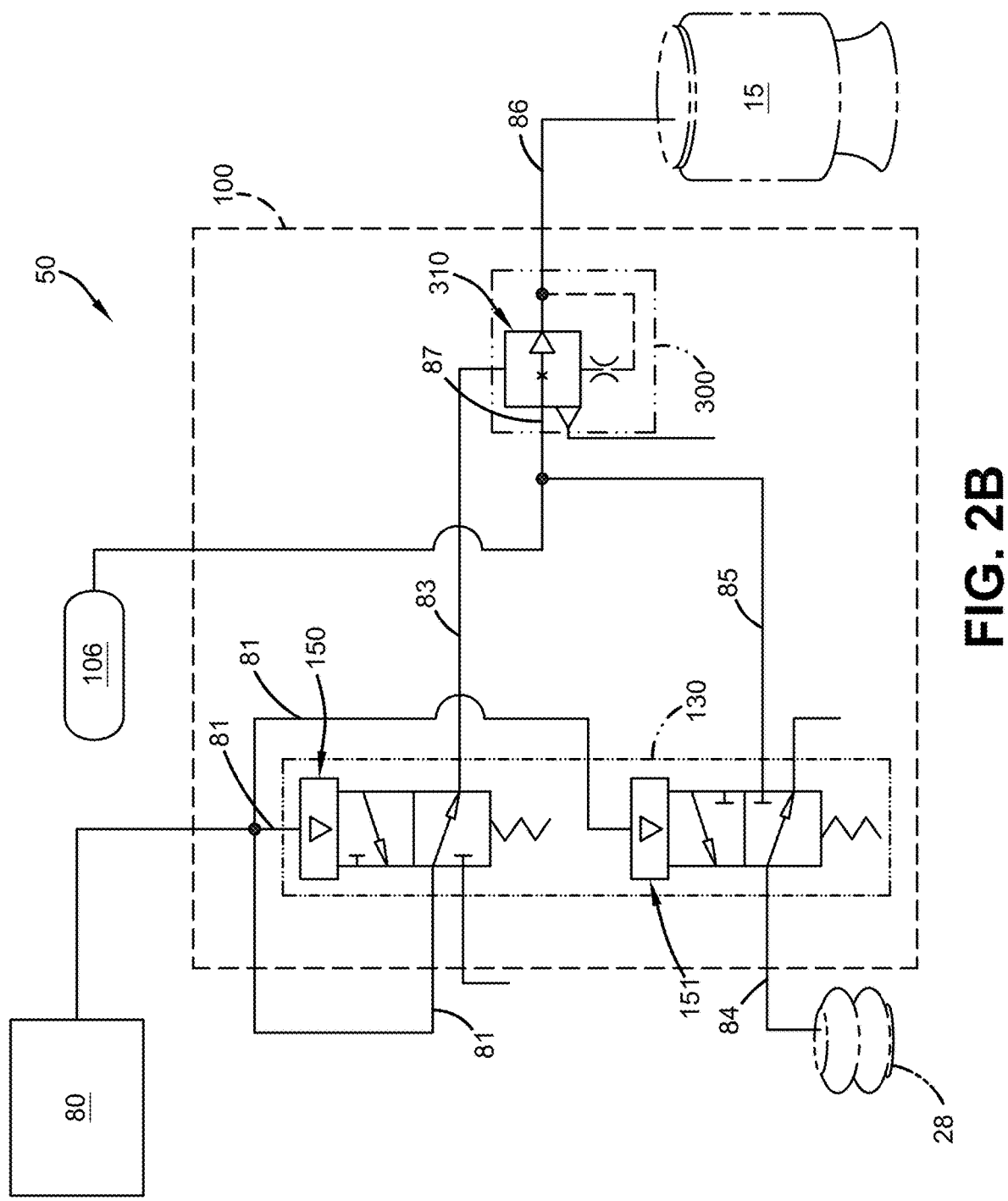
FIG. 2B is a schematic view of the exemplary embodiment control apparatus shown in FIG. 2A, showing an alternative configuration of the primary controller.
Figure 2C:
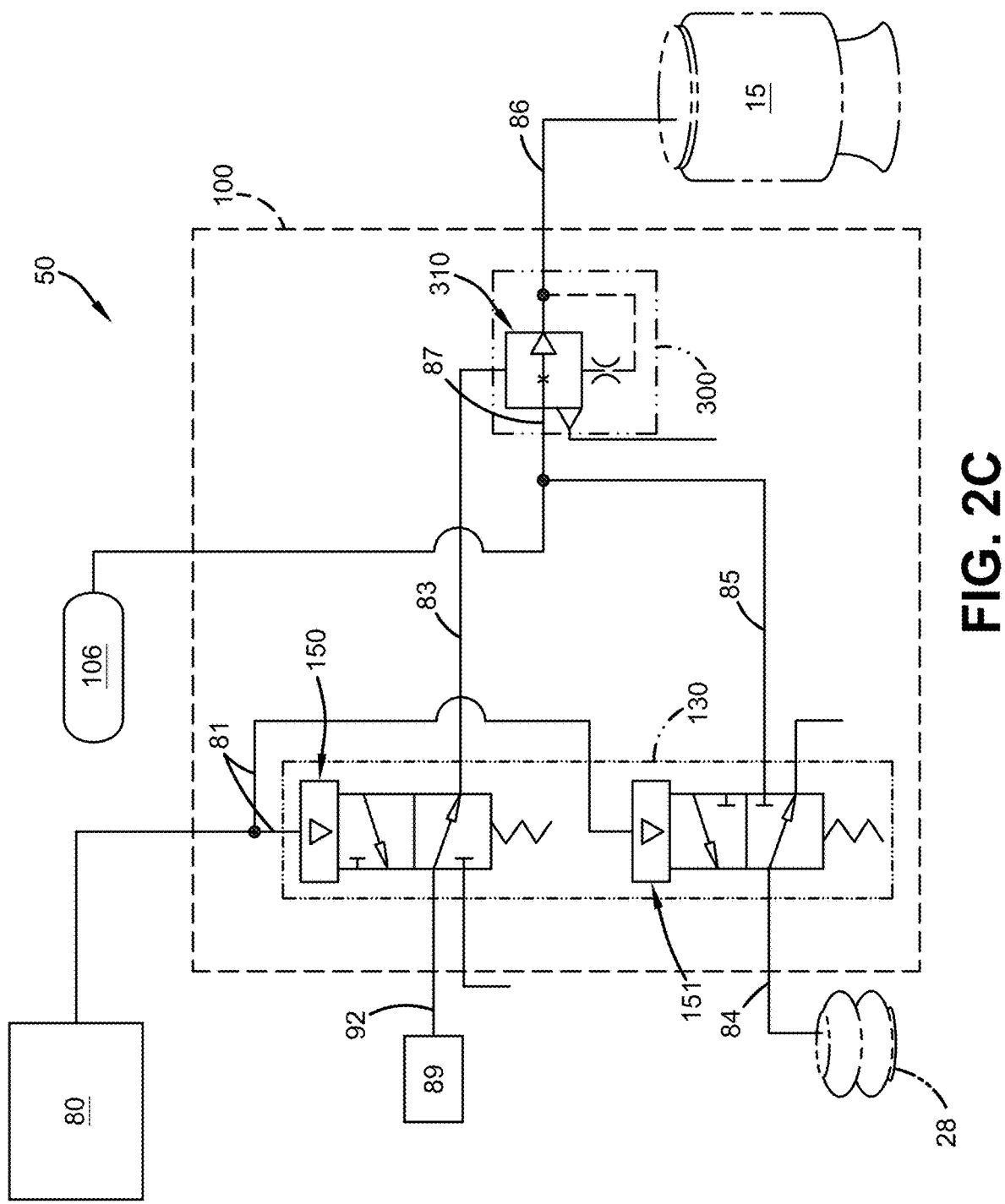
FIG. 2C is a schematic view of the exemplary embodiment control apparatus shown in FIGS. 2A-B, showing another alternative configuration of the primary controller.

Upper portion 132 may be formed with a pair of openings or pilot ports 138, each extending separately from chambers 134, 136 through the outer surface of the upper portion to provide fluid communication between both chambers and primary controller 80 through conduit 81, as described above. It is also contemplated that upper portion 132 may have only a single pilot port in fluid communication with both chambers 134, 136. Lower portion 133 includes exhaust ports 140, 141; output ports 142, 143; and supply ports 144, 145 extending from, and in fluid communication with, chambers 134, 136, respectively, through the outer surface of the lower portion. More specifically, exhaust ports 140, 141 provide fluid communication between chambers 134, 136, respectively, and the atmosphere surrounding poppet module 130 of secondary controller 100 or the atmosphere surrounding the end of respective conduits (not shown) connected to, or in-line with, the exhaust ports. Output port 142 may provide fluid communication between chamber 134 and relay module 300 through any suitable means, such as a conduit 83 (FIG. 2A-C). Output port 143 may provide fluid communication between chamber 136 and lift bag 28 through any suitable means, such as a conduit 84. Supply port 144 may provide fluid communication between chamber 134 and primary controller 80 through conduits 81, 82 or between the chamber and height control valve 89 through conduit 92. Supply port 145 may provide fluid communication between source of fluid pressure 106 and chamber 136 through any suitable means, such as a conduit 85.

Chambers 134, 136 may be formed with any suitable shape, such as generally cylindrical, capable of receiving and housing a cartridge valve, such as normally-open, 3-way, 2-position, pilot-operated cartridge valve (NO 3/2 cartridge valve) 150 and normally-closed, 3-way, 2-position, pilot-operated cartridge valve (NC 3/2 cartridge valve) 151, respectively. Cartridge valves 150, 151 may be any suitable type of cartridge valve, such as slip-in or screw-in, as is known. Cartridge valves 150, 151 include a respective valve body 154, 156 having a pilot inlet 158, 159, respectively, that may be aligned and in fluid communication with the respective pilot port 138 of poppet module 130. As a result, cartridge valves 150, 151 may be in fluid communication with primary controller 80 through conduit 81, pilot ports 138, and respective inlets 158, 159. Valve bodies 154, 156 also include respective supply inlets 164, 165; delivery outlets 162, 163; and exhaust outlets 160, 161, all of which may be formed as annular grooves. Supply inlets 164, 165 may be aligned and in fluid communication with supply ports 144, 145, respectively, of poppet module 130. As a result, cartridge valve 150 may be in fluid communication with primary controller 80 through conduit 82, supply port 144, and supply inlet 164. Cartridge valve 151 may be in fluid communication with source of fluid pressure 106 through conduit 85, supply port 145, and supply inlet 165. Similarly, delivery outlets 162, 163 may be aligned and in fluid communication with output ports 142, 143, respectively, of poppet module 130, such that cartridge valve 150 may be in fluid communication with relay module 300 through conduit 83, the respective output port, and the respective delivery outlet. Cartridge valve 151 may be in fluid communication with lift bag 28 through conduit 84, output port 143, and delivery outlet 163. Exhaust outlets 160, 161 may be aligned and in fluid communication with exhaust ports 140, 141, respectively, of the poppet module, such that respective cartridge valves 150, 151 may be in fluid communication with atmosphere through the respective exhaust ports and exhaust outlets.

In accordance with another important aspect of the present invention, cartridge valves 150, 151 include respective poppet assemblies 170, 172 disposed within valve bodies 154, 156, respectively. Poppet assemblies 170, 172 include respective actuable valve portions 173, 174 and respective actuable pilot piston portions 175, 176. Piston portions 175, 176 may each have relatively different shapes or forms but include respective pilot areas 182, 183 adjacent pilot inlets 158, 159, respectively. Each piston portion 175, 176 also includes a respective O-ring 184, 185 disposed about the piston portion adjacent respective pilot areas 182, 183 and in contact with the inner surface of chambers 134, 136, respectively, of poppet module 130. O-rings 184, 185 prevent the leaking of fluid flow and fluid pressure around pilot areas 182, 183, respectively, and into respective bodies 154, 156 of cartridge valves 150, 151, respectively. A pair of bias springs 186, 187 disposed within bodies 154, 156, respectively, about, and at least partially in contact with, piston portions 175, 176, respectively, bias pilot areas 182, 183, respectively, of the piston portions against respective pilot inlets 158, 159. Pilot areas 182, 183 of piston portions 175, 176, respectively, are formed with a relatively larger diameter or dimension (not shown) than the prior art and are exposed to fluid flow from respective pilot inlets 158, 159 during operation. The relatively larger dimension of pilot areas 182, 183 enables respective piston portions 175, 176 to more easily overcome the force of springs 186, 187, respectively, such that cartridge valves 150, 151, respectively, are actuable at lower pilot fluid pressures, such as from about 7 psi to about 20 psi, more preferably from about 12 psi to about 15 psi.

Piston portions 175, 176 also include respective stems 188, 189 extending away from respective pilot areas 182, 183 and into bodies 154, 156, respectively, of the respective cartridge valves 150, 151. In particular, stem 188 of piston portion 175 extends through a portion of body 154 of NO 3/2 cartridge valve 150. Stem 188 may be in contact with or spaced a distance from an end of a shaft 191 of valve portion 173 to selectively control fluid communication through poppet assembly 170 based upon the introduction of a fluid flow through pilot port 138 and pilot inlet 158, as described in more detail below. Similarly, stem 189 of piston portion 176 extends through a portion of body 156 of NC 3/2 cartridge valve 151. An O-ring 190 is disposed about the end of stem 189 axially-opposite pilot area 183 and may be in contact with and form a seal between an exhaust seat 157 of body 156 and the stem. Stem 189 may be spaced a distance from or in contact with an end of a shaft 192 of valve portion 174 to selectively control fluid communication through poppet assembly 172 based upon the introduction of a fluid flow through pilot port 138 and pilot inlet 159, as described in more detail below.

Valve portions 173, 174 of poppet assemblies 170, 172, respectively, may each have relatively different shapes or forms but include respective plugs 193, 194. Plugs 193, 194 may be continuous with and arranged axially opposite respective shafts 191, 192 of valve portions 173, 174, respectively. In particular, plug 193 may be formed with any suitable shape, although symmetrical shapes, such as generally bulbous, are preferred in order to center the valve portion 173 and prevent loss of the valve portion from poppet assembly 170 when cartridge valve 150 is pressurized. Plug 193 may also include a supply O-ring or sealing surface 201 and an exhaust O-ring or sealing surface 202. More particularly, supply sealing surface 201 may be spaced an axial distance from exhaust sealing surface 202 and is capable of contacting a supply seat 152 of body 154 of NO 3/2 cartridge valve 150 to form a seal between valve portion 173 and the body, thereby preventing fluid flow between supply inlet 164 and delivery outlet 162. Similarly, exhaust sealing surface 202 is capable of contacting an exhaust seat 153 of body 154 of NO 3/2 cartridge valve 150 during operation to form a seal between valve portion 173 and the body, thereby preventing fluid flow between supply inlet 164 and exhaust outlet 160. Plug 194 of valve portion 174 may be formed with any suitable shape, although symmetrical shapes, such as frustoconical, are preferred in order to center the valve portion 174 and prevent loss of the valve portion from poppet assembly 172 when cartridge valve 151 is pressurized. Plug 194 may also include a supply O-ring or sealing surface 204. More specifically, supply sealing surface 204 may be capable of contacting a supply seat 155 of body 156 of NC 3/2 cartridge valve 151 during operation to form a seal between valve portion 174 and the body, thereby preventing fluid flow between supply inlet 165 and delivery outlet 163. Poppet assemblies 170, 172 also include respective return springs 196, 197 disposed within bodies 154, 156 of cartridge valves 150, 151, respectively, and in contact with or engaging a portion of plugs 193, 194, respectively. Return springs 196, 197 bias valve portions 173, 174, respectively, such that exhaust sealing surface 202 of plug 193 and supply sealing surface 204 of plug 194 are normally in contact with exhaust seat 153 and supply seat 155, respectively. Thus, poppet assemblies 170, 172 of cartridge valves 150, 151, respectively, selectively control fluid flow between source of fluid pressure 106 and lift bag 28 as well as between primary controller 80 and relay module 300, as described in further detail below.

In accordance with an important aspect of the present invention, poppet module 130 utilizes cartridge valves 150, 151 in a manner that allows the cartridge valves to be interchangeable, providing flexibility to control apparatus 50 such that the control apparatus may be used across various configurations of lift axle/suspension system 10 without requiring additional parts. For example, the configuration of cartridge valves 150, 151 in poppet module 130, as shown in FIGS. 2A-3B, provide lift axle/suspension system 10 with a default extended state in which beam 14 and axle 21 are normally down. Swapping the position of NO 3/2 cartridge valve 150 for that of NC 3/2 cartridge valve 151 within poppet module 130 changes the default state of lift axle/suspension system 10 such that beam 14 and axle 21 are normally raised. Thus, poppet module 130 of secondary controller 100 provides control apparatus 50 with versatility to be utilized across different configurations of lift axle/suspension system 10 without the use of additional components.

Relay module 300 (FIG. 4) of secondary controller 100 of control apparatus 50, according to the present invention, may include a delivery chamber 302 interconnected with a separate control chamber 304 formed within the relay module. In particular, a wall 306 may be formed between chambers 302, 304 to at least partially separate the chambers from each other. More particularly, wall 306 may be formed with a central opening 307 extending between chambers 302, 304. A control port 332 and an exhaust port 334 are formed from chamber 304 and extend through the outer surface of relay module 300. Control port 332 may provide fluid communication between output port 142 of poppet module 130 and chamber 304 of relay module 300 through conduit 83. Exhaust port 334 provides fluid communication between chamber 302 and the environment surrounding relay module 300. A delivery port 336 and a supply port 338 are formed from chamber 302 and extend through the outer surface of relay module 300. Delivery port 336 provides fluid communication between chamber 302 of relay module 300 and air spring 15 through any suitable means, such as a conduit 86 (FIGS. 2A-C, 5). Supply port 338 provides fluid communication between source of fluid pressure 106 and chamber 302 of relay module 300 through any suitable means, such as a conduit 87.

In accordance with another important aspect of the present invention, relay module 300 also includes a one-to-one relay valve assembly 310 that may adjust pressure to delivery port 336 to match a pressure at control port 332 by increasing flow through supply port 338 or by increasing flow through exhaust port 334. In particular, valve assembly 310 may be at least partially disposed within and extending between chambers 302, 304 to provide selective control of fluid communication between supply port 338 and delivery port 336 as well as between the delivery port and exhaust port 334, as described in more detail below. More particularly, valve assembly 310 includes a supply portion 312 and an exhaust portion 314. Supply portion 312 may be entirely disposed within chamber 302 adjacent opening 307 of wall 306. A spring 316 may be at least partially disposed within supply portion 312 and may bias the supply portion in the direction of opening 307 of wall 306 to contact a supply seat 318, thereby blocking fluid communication between supply port 338 and delivery port 336. Exhaust portion 314 may be disposed within chamber 304 and may at least partially extend into chamber 302 as well as into exhaust port 334. More specifically, exhaust portion 314 includes a central hollow tube or stem 322 that may extend from within exhaust port 334 through chamber 304 and opening 307 into chamber 302. Exhaust portion also includes a piston 324 that may be integrally formed with and extend radially outward from stem 322 and have a seal or O-ring 325 disposed about a perimeter of the piston and in contact with the inner surface of chamber 304. Thus, piston 324 of exhaust portion 314 divides chamber 304 such that fluid flow entering the chamber from control port 332 may be at least partially confined to one side of the piston away from wall 306. A spring 326 may be disposed within chamber 304 about a portion of stem 322 and in contact with or engaging one side of piston 324 to bias exhaust portion 314 in a direction toward wall 306. More particularly, spring 326 may bias an end of stem 322 through opening 307 of wall 306 and into contact with an exhaust seat 320 formed on an end of supply portion 312. Spring 326 is configured to have a spring constant sufficient to bias stem 322 against exhaust seat 320 without overcoming the force exerted by spring 316 that biases supply portion 312 against supply seat 318. As a result, piston 324 of exhaust portion 314, spring 326, and supply portion 312 cooperate to selectively control fluid communication between delivery port 336 and exhaust port 334 in response to fluid flow from control port 332, as described in more detail below.

In accordance with another important aspect of the present invention, wall 306 and piston 324 are formed with a damping orifice 305 and an equalization orifice 323, respectively. Damping orifice 305 and equalization orifice 323 may be formed with any suitable cross-sectional shape, such as elongated pyramidal or cylindro-conical, and may have any suitable inner diameter or dimension (not shown), such that the inner diameter or dimension of the damping orifice is greater than the inner diameter or dimension of the equalization orifice. It is also contemplated that threaded chokes (not shown) may be used in place of orifices 305, 323 and utilized to tune relay valve assembly 310 for specific applications. Damping orifice 305 extends from chamber 304 through wall 306 and may taper into chamber 302. Damping orifice 305 provides restricted fluid communication or flow between chamber 302 and chamber 304 to reduce the effects of sudden changes in fluid pressure at delivery port 336 caused by jounce and/or rebound events of air spring 15 on operation of valve assembly 310. More particularly, damping orifice 305 provides restricted fluid communication between chamber 302 and the portion of chamber 304 between wall 306 and piston 324. Restricted fluid communication between chamber 302 and the portion of chamber 304 between wall 306 and piston 324 cushions or damps sudden or transient fluctuations in fluid pressure occurring within the delivery chamber and conduit 86 due to deformations of air spring 15 during jounce and rebound events. As a result, response of valve assembly 310 to transient pressure changes in air spring 15, which create pressure changes within chamber 302, is reduced compared to prior art relay valves, thereby reducing air consumption of relay module 300.

Equalization orifice 323 extends from one side of piston 324 through the piston and tapers toward the side of the piston adjacent wall 306. Orifice 323 provides restricted fluid communication across piston 324 within chamber 304 to equalize fluid pressure generated by fluid flow from delivery port 336 with fluid pressure generated by fluid flow from control port 332. More specifically, orifice 323 provides restricted fluid communication between and equalization of the fluid pressure within the portion of chamber 304 adjacent wall 306 and the fluid pressure in the portion of chamber 304 adjacent control port 332, as described in more detail below. As a result, orifice 323 ameliorates the hysteresis experienced by prior art relay valves and ensures that the fluid flow delivered to air spring 15 precisely matches the fluid flow transmitted by primary controller 80 through conduit 83 to control port 332.

With particular reference to FIGS. 2A-3A and 4, during operation of the heavy-duty vehicle, lift axle/suspension system 10, may be actuated, or controlled, and maintained in a retracted or extended state by control apparatus 50. In particular, an operator of the heavy-duty vehicle may utilize primary controller 80 to trigger the retraction or extension of lift axle/suspension assembly 11. With the configuration of cartridge valves 150, 151 within poppet module 130 described above and shown in FIGS. 2-3B, lift axle/suspension system 10 would default to an extended position. In order to establish such a default state, source of fluid pressure 106 provides fluid flow through conduit 85, supply port 145 of poppet module 130, and supply inlet 165 into NC 3/2 cartridge valve 151. Because return spring 197 biases valve portion 174 of poppet assembly 172 of NC 3/2 cartridge valve 151 such that sealing surface 204 is normally in contact with supply seat 155, fluid flow cannot proceed past the supply portion, thereby generating a fluid pressure. Source of fluid pressure 106 also provides fluid flow through conduit 87 to supply port 338 of relay module 300. Primary controller 80 may also provide a control signal or fluid flow through conduits 81, 82; supply port 144 of poppet module 130; and supply inlet 164 into NO 3/2 cartridge valve 150. Alternatively, a control signal may be provided by height control valve 89 through conduit 92, supply port 144 of poppet module 130, and supply inlet 164 into cartridge valve 150. Because return spring 196 biases plug 193 of valve portion 173 of poppet assembly 170 such that sealing surface 202 is in contact with exhaust seat 153 of cartridge valve 150, fluid flow is directed through body 154 and out delivery outlet 162 and output port 142.

The fluid flow from output port 142 continues through conduit 83 and control port 332 of relay module 300 into the portion of chamber 304 adjacent the control port. This fluid flow generates a fluid pressure, or control pressure, within the portion of chamber 304 adjacent control port 332 and applies a force to piston 324 of exhaust portion 314 that is transmitted along stem 322 in the direction of wall 306. In addition, the control pressure within the portion of chamber 304 adjacent control port 332 causes restricted fluid communication across piston 324 through equalization orifice 323 into the portion of the chamber between wall 306 and the piston. In the event that the control pressure and spring 326 provide piston 324 with sufficient force to overcome the force of spring 316 of supply portion 312, the fluid pressure within the portion of chamber 304 between wall 306 and the piston, and the fluid pressure at supply port 338, stem 322 will move the supply portion away from supply seat 318. As a result, fluid flow will proceed from source of fluid pressure 106 through conduit 87 and supply port 338 of relay module 300 past supply portion 312 into chamber 302 and out delivery port 336 through conduit 86 and into air spring 15 to inflate the air spring. Moreover, fluid flow into chamber 302 generates a fluid pressure, or the delivery pressure, that causes restricted fluid flow through damping orifice 305 into the portion of chamber 304 between wall 306 and piston 324. Thus, the portion of chamber 304 between wall 306 and piston 324 provides space for the intermixing and equalization of the control pressure and the delivery pressure such that the delivery pressure will more accurately match, or be 1:1 with, the control pressure than prior art relay valves, thereby ensuring proper inflation of air spring 15 based on the control pressure transmitted by primary controller 80. As the control pressure and delivery pressure equalize, the force generated by springs 316, 326 of supply portion 312 and exhaust portion 314, respectively, predominate over the movement of valve assembly 310, such that the supply portion once again becomes seated against supply seat 318. As a result, in the default state of lift axle/suspension assembly 11, control apparatus 50, according to the present invention, ensures proper inflation of air spring 15 and maintains deflation of lift bag 28, such that each lift axle/suspension assembly of lift axle/suspension system 10 is extended.

In accordance with an important aspect of the present invention, air spring 15 of lift axle/suspension system 10 may experience a jounce and/or rebound event during operation. As a result, the fluid pressure within air spring 15 will fluctuate, causing the delivery pressure within chamber 302 of relay module 300 to fluctuate accordingly. However, because piston 324 is separated from chamber 302 by wall 306, changes in the delivery pressure due to transient pressure changes in air spring 15 cannot directly affect movement of valve assembly 310. More specifically, transient changes of the delivery pressure within chamber 302 only reach piston 324 by restricted fluid communication and flow through damping orifice 305, leading to a damping effect. As a result, valve assembly 310 does not respond or has a muted or minimized response to transient pressure changes within air spring 15 and/or chamber 302 of relay module 300 such that the relay module, and thus secondary controller 100, has relatively less fluid consumption than the relay valves of the prior art.

In the event lift axle/suspension system 10 needs to be raised, the operator of the heavy-duty vehicle can utilize an interface of primary controller 80 of control apparatus 50 to raise each lift axle/suspension assembly 11. In particular, once triggered by the operator, primary controller 80 may provide a pilot signal or fluid flow through conduit 81 to pilot ports 138 of pilot module 130. The fluid flow enters pilot inlets 158, 159 and generates a fluid pressure, or the pilot pressure, that applies a force to respective pilot areas 182, 183 that, if over a predetermined value, such as less than 15 psi, causes the piloting of cartridge valves 150, 151, respectively. More particularly, in the event that the pilot pressure applies a force against pilot area 182 that overcomes the force of bias spring 186 and return spring 196, piston portion 175 will shift in a direction toward valve portion 173. Stem 188 of piston portion 175 will then push shaft 191 of valve portion 173 causing poppet assembly 170 to shift in a direction toward return spring 196. Poppet assembly 170 will continue to shift such that sealing surface 202 of plug 193 of valve portion 173 moves away from exhaust seat 153 of valve body 154, allowing fluid communication between output port 142 and exhaust port 140. As a result, fluid flow will proceed from conduit 83 and the portion of chamber 304 adjacent control port 332 of relay module 300 through cartridge valve 150 and exhaust port 140 to atmosphere, reducing the control pressure within the portion of the chamber. This reduction in the control pressure within the portion of chamber 304 adjacent control port 332 allows delivery pressure within chamber 302 and fluid pressure within the portion of chamber 304 between wall 306 and piston 324 to apply a force to the piston that, if greater than the force of spring 326, moves exhaust portion 314 of valve assembly 310 in a direction away from supply portion 312. As exhaust portion 314 moves, stem 322 separates from exhaust seat 320 of supply portion 312, providing fluid communication between chamber 302 and exhaust port 334. As a result, fluid pressure within air spring 15 is vented through conduit 86, delivery port 336, and chamber 302 down stem 322 and out exhaust port 334 to atmosphere, deflating the air spring. Piston portion 175 and valve portion 173 of poppet assembly 170 continue to shift within body 154 of cartridge valve 150 due to the pilot pressure acting against pilot area 182 until sealing surface 201 contacts supply seat 152, stopping further movement of the poppet assembly and blocking fluid communication and flow between supply port 144 and output port 142, while allowing fluid communication between conduit 83 and exhaust port 140, thereby maintaining air spring 15 in a deflated state.

Similarly, in the event that the pilot signal transmitted by primary controller 80 generates a pilot pressure that applies a force against pilot area 183 that overcomes the force of bias spring 187, piston portion 176 will shift in a direction toward valve portion 174 such that stem 189 of the piston portion contacts an end of shaft 192 of the supply portion. If the pilot pressure applies a force sufficient to also overcome return spring 197, poppet assembly 172 will continue to move in a direction toward the return spring such that sealing surface 204 moves away from supply seat 155, providing fluid communication between supply port 145 and output port 143. As a result, poppet assembly 172 provides fluid communication and flow between source of fluid pressure 106 and lift bag 28 through cartridge valve 151, inflating the lift bag and elevating or retracting each lift axle/suspension assembly 11 from contact with the ground. Because source of fluid pressure is located proximate to lift axle/suspension system 10, inflation of lift bag 28 may be relatively faster than in the prior art, thus providing for relatively faster retraction of lift axle/suspension assembly 11. While primary controller 80 continues to transmit a pilot signal, poppet assembly 172 will continue to move until O-ring 190 of stem 176 contacts exhaust seat 157, blocking fluid communication between output port 143 and exhaust port 141 and preventing fluid flow from lift bag 28 to the exhaust port, thereby preventing venting of the lift bag to atmosphere through poppet module 130 and maintaining fluid pressure within the lift bag.

Thus, control apparatus 50, according to the present invention, provides secondary controller 100, having poppet module 130 and relay module 300, that is compatible with most heavy-duty vehicle lift axle/suspension applications while being relatively faster and more accurate than prior art systems, providing quicker retraction and extension of lift axle/suspension systems, such as lift axle/suspension system 10, and improved control over inflation of air spring 15. Secondary controller 100 also provides reduced fluid consumption, reducing the wear on components of control apparatus 50, thereby reducing downtime and maintenance cost of the heavy-duty vehicle and increasing the service-life of the control apparatus.

Another exemplary embodiment control apparatus 450 (FIG. 5), according to the present invention, may be utilized with a lift axle/suspension system, such as lift axle/suspension system 10 (FIG. 1) (partially shown). Control apparatus 450 is similar in structure and arrangement to control apparatus 50, as shown in FIG. 2B. As such the description below will be directed to the differences between control apparatus 50 and control apparatus 450. In particular, control apparatus 450 includes a secondary controller 500 in fluid communication with a primary controller, such as primary controller 80.

Primary controller 80 may deliver a pilot signal or fluid flow to secondary controller 500 through any suitable means, such as conduit 81 in order to control and/or maintain the inflation and/or deflation of air spring 15 and lift bag 28, thereby controlling and/or maintaining the extension and/or retraction of lift axle/suspension assembly 11. Secondary controller 500 may include one-to-one relay module 300, described above, and a simplified poppet module 530. More specifically, control port 332 of relay module 300 may provide fluid communication between primary controller 80 and chamber 304 of the relay module through any suitable means, such as conduit 81.

Figure 6:
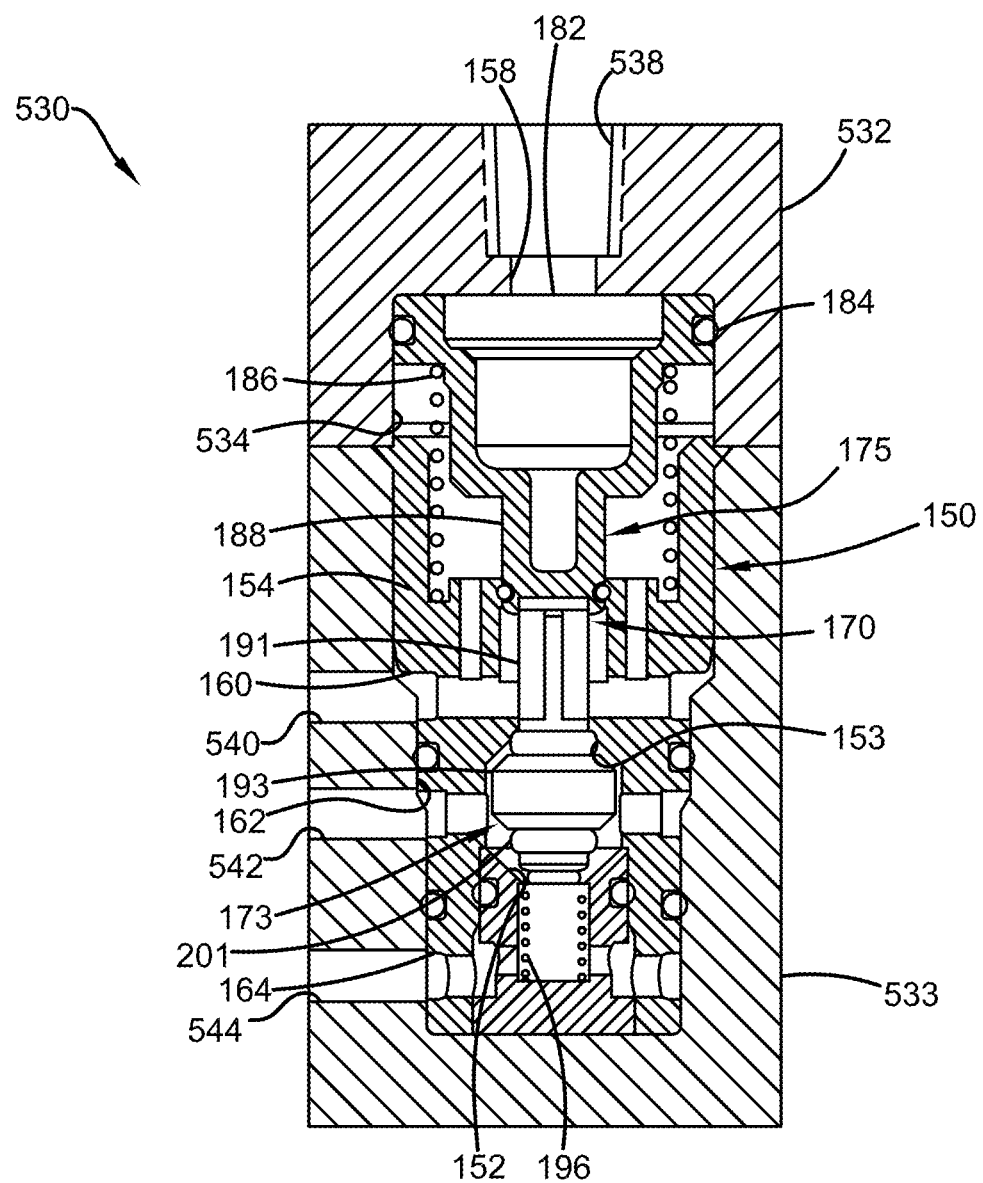
FIG. 6 is an elevational view, in section, of the poppet module of the exemplary control apparatus, according to the present invention, shown in FIG. 5.

In accordance with an important aspect of the present invention, and with particular reference to FIG. 6, poppet module 530 may be formed as a two-piece structure using any suitable material, such as metal or plastic, using any suitable method, such as extrusion. Poppet module 530 includes an upper portion 532 and a lower portion 533 and a single pocket or chamber 534 formed within and extending at least partially between the upper and lower portions. Chamber 534 may be formed with any suitable shape, such as generally cylindrical, capable of receiving and housing a cartridge valve, such as NO 3/2 cartridge valve 150, described above, for a normally-up, or raised, configuration of axle 21 of lift axle/suspension assembly 11. Upper portion 532 may be formed with an opening or pilot port 538 extending from chamber 534 through the outer surface of the upper portion to provide fluid communication between cartridge valve 150 and primary controller 80 through any suitable means, such as conduit 81. Lower portion 533 includes an exhaust port 540, an output port 542, and a supply port 544 extending from, and in fluid communication with, cartridge valve 150, disposed within chamber 534, through the outer surface of the lower portion. More specifically, exhaust port 540 may provide fluid communication between the atmosphere surrounding poppet module 530 of secondary controller 500 or the atmosphere surrounding the end of a conduit (not shown) connected to, or in-line with, the exhaust port and exhaust outlet 160 of cartridge valve 150. Output port 542 may provide fluid communication between delivery outlet 162 of cartridge valve 150 and lift bag 28 through any suitable means, such as conduit 84. Supply port 544 may provide fluid communication between source of fluid pressure 106 and supply inlet 164 of cartridge valve 150 through any suitable means, such as conduit 85.

In the event lift axle/suspension system 10 needs to be deployed or extended, the operator of the heavy-duty vehicle can utilize an interface of primary controller 80 of control apparatus 450 to lower each lift axle/suspension assembly 11, such that the wheels (not shown) contact the ground. In particular, once triggered by the operator, primary controller 80 may provide a regulating signal, or fluid flow, through conduit 81 to pilot port 538 of pilot module 530 and to control port 332 of relay module 300. The fluid flow enters pilot inlets 158 of cartridge valve 150 and generates a fluid pressure, the pilot pressure, that applies a force to pilot area 182 and, if over a predetermined value, such as less than 15 psi, causes the piloting of the cartridge valve, thereby allowing fluid communication between delivery outlet 162, output port 542, conduit 84, exhaust outlet 160, and exhaust port 540. As a result, fluid flows from lift bag 28 and through conduit 84, venting or exhausting the lift bag through cartridge valve 150 and lowering lift axle/suspension system 10. Simultaneously, the regulating signal, or fluid flow, from conduit 81 enters control port 332 of relay module 300, generating a fluid pressure, the control pressure, in chamber 304 adjacent the control port. The control pressure within the portion of chamber 304 adjacent control port 332 acts on piston 324, overcoming the force of spring 316 and moving supply portion 312 away from supply seat 318. As a result, fluid flow from source of fluid pressure 106 moves through supply port 338 past supply portion 312 into chamber 302 through delivery port 336 to air spring 15, inflating the air spring of the lowered lift axle/suspension assembly 11.

Thus, control apparatus 450, according to the present invention, provides secondary controller 500, having the simplified poppet module 530 that is optimized for a reduced number of components, thereby increasing reliability while reducing cost. Secondary controller 500, having poppet module 530 and relay module 300, is compatible with most heavy-duty vehicle lift axle/suspension applications while being relatively faster and more accurate than prior art systems, providing quicker retraction and extension of lift axle/suspension systems, such as lift axle/suspension system 10, and improved control over inflation of air spring 15. Secondary controller 500 with relay module 300 also provides reduced fluid consumption, reducing the wear on components of control apparatus 450, thereby reducing maintenance costs and downtime of the heavy-duty vehicle and increasing the service-life of the control apparatus.

Figure 7:
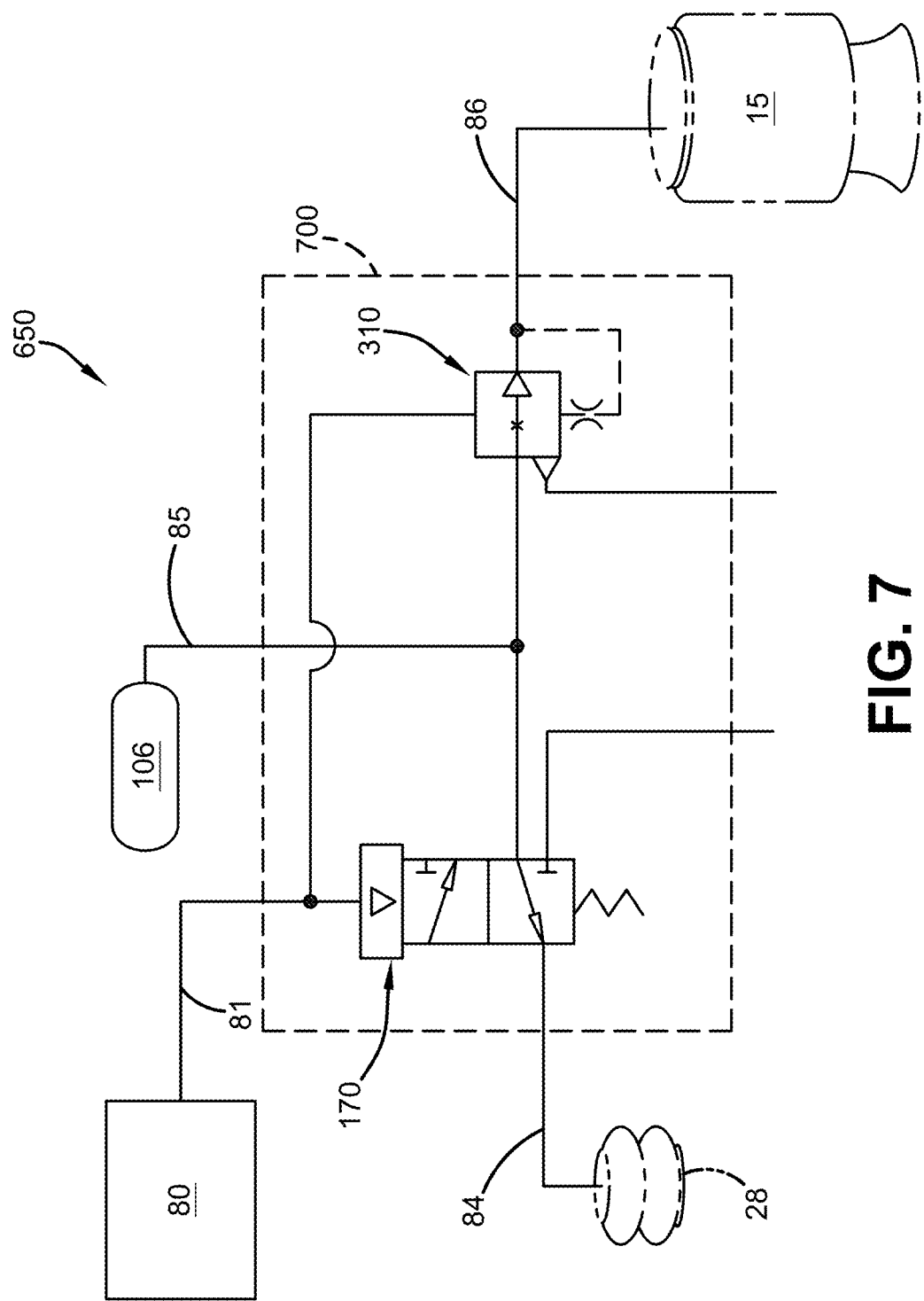
FIG. 7 is a schematic view of another exemplary embodiment control apparatus, according to the present invention, utilized with the lift axle/suspension assembly shown in FIG. 1.

Another exemplary embodiment control apparatus 650 (FIG. 7), according to the present invention, may be utilized with a lift axle/suspension system, such as lift axle/suspension system 10 (FIG. 1) (partially shown). Control apparatus 650 is similar in structure and arrangement to control apparatus 450, shown in FIG. 5. As such, the description below will be directed to the differences between control apparatus 450 and control apparatus 650. In particular, control apparatus 650 includes a secondary control module 700 in fluid communication with a primary controller, such as primary controller 80, and a source of fluid pressure, such as source of fluid pressure 106.

Figure 8:
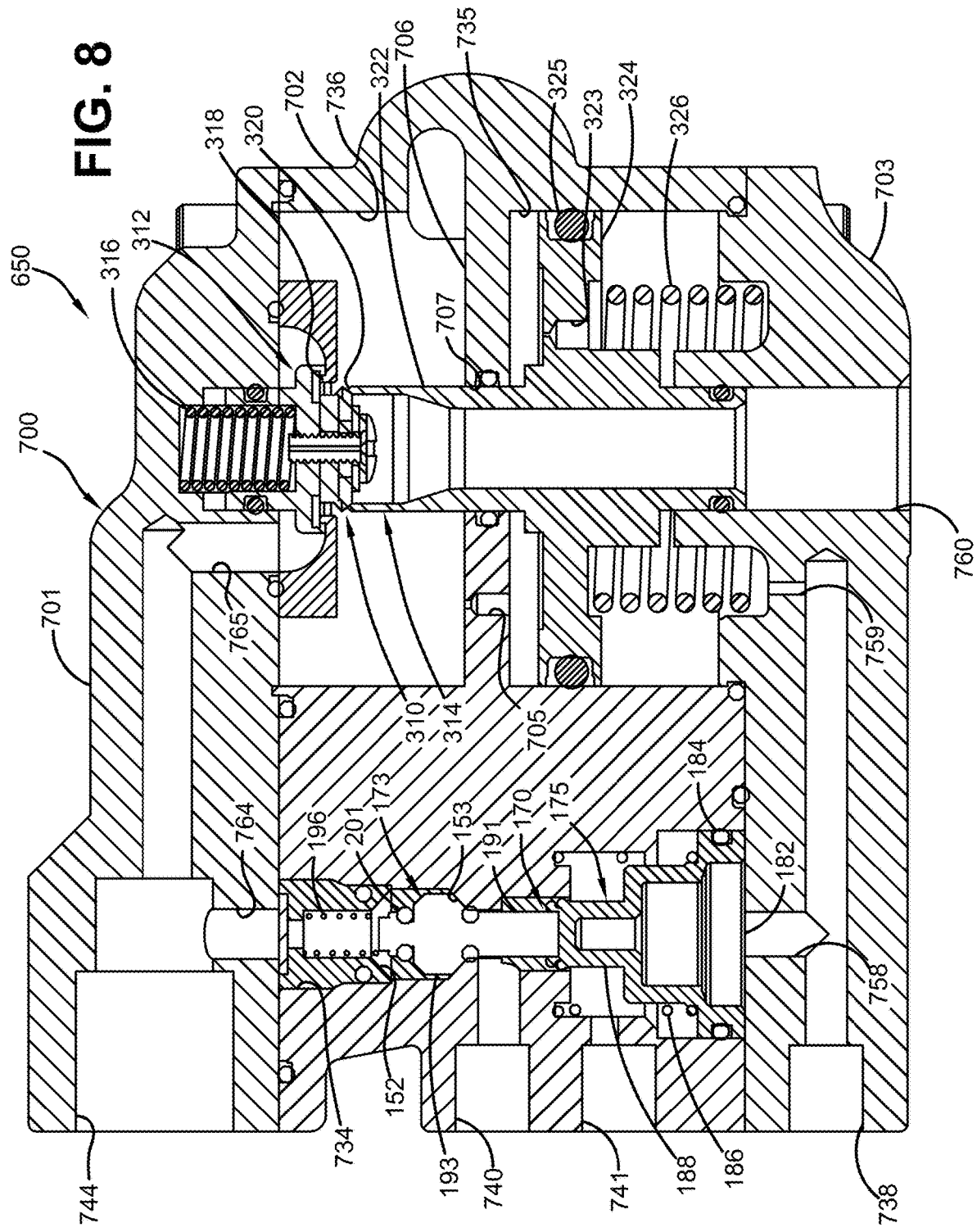
FIG. 8 is an elevational view, in section, of the secondary control module of the exemplary control apparatus, according to the present invention, shown in FIG. 7.

Secondary control module 700 may be formed from any suitable material, such as metal, as a single unit having a plurality of interconnected pieces, such as an upper portion 701 (FIG. 8), intermediate portion 702, and lower portion 703. Upper and lower portions 701, 703, respectively, may be removable attached or connected to intermediate portion 702 using any suitable means, such as fasteners. More specifically, secondary control module 700 may include a chamber 734 formed within intermediate portion 702 that may extend at least partially into one or both of upper and lower portions 701, 703, respectively. Secondary control module 700 may also include a pair of interconnected chambers 735, 736 formed within intermediate portion 702 and partially separated by a wall 706 having an opening 707 formed through the wall. Wall 706 may also be formed with a damping orifice 705 extending from chamber 736 to chamber 735. Damping orifice 705 may be similar in structure and arrangement to damping orifice 305 of relay module 300, described above.

Secondary control module 700 may include a pilot port 738 formed in lower portion 703 and in fluid communication with primary controller 80 through any suitable means, such as conduit 81. A poppet pilot inlet 758 and a relay pilot 759 inlet may provide fluid communication between pilot port 738 and chambers 734, 735, respectively. Secondary control module 700 may also include a supply port 744 formed in upper portion 701 and in fluid communication with source of fluid pressure 106 through any suitable means, such as conduit 85. A poppet supply inlet 764 and a relay supply inlet 765 may provide fluid communication between supply port 744 and chambers 734, 736, respectively. Secondary control module 700 may include one or more poppet exhaust ports 740, 741 formed in intermediate portion 702 and in fluid communication between chamber 734 and the atmosphere external to the secondary control module. Similarly, a relay exhaust port 760 may be formed in lower portion 703 and provide fluid communication between chambers 735, 736 and the atmosphere surrounding secondary control module 700. Secondary control module 700 may also include a pair of output ports (not shown). One of the output ports may provide fluid communication between chamber 734 and lift bag 28 of lift axle/suspension assembly 11 through a conduit, such as conduit 84. Similarly, the other output port may provide fluid communication between chamber 736 and air spring 15 of lift axle/suspension assembly 11 through a conduit, such as conduit 86.

Primary controller 80 may deliver a signal or fluid flow to secondary control module 700 through conduit 81 in order to control and/or maintain the inflation and/or deflation of air spring 15 and lift bag 28 of lift axle/suspension assembly 11, thereby controlling and/or maintaining the extension and/or retraction of lift axle/suspension assembly 11. In particular, and in accordance with an important aspect of the present invention, secondary control module 700 may include poppet assembly 170, described above, disposed within chamber 734. In addition, secondary control module 700 may also include one-to-one relay valve assembly 310, described above, disposed within chambers 735, 736. In the event lift axle/suspension system 10 needs to be deployed or extended, the operator of the heavy-duty vehicle can utilize an interface of primary controller 80 of control apparatus 650 to lower each lift axle/suspension assembly 11, such that the wheels (not shown) contact the ground. More particularly, once triggered by the operator, primary controller 80 may provide a control signal, or fluid flow, through conduit 81 to pilot port 738 of secondary control module 700. The fluid flow enters poppet pilot inlet 758, generating a fluid pressure that applies a force to pilot area 182 of poppet assembly 170. If the fluid pressure generated against pilot area 182 is greater than a predetermined value, such as less than 15 psi, poppet assembly 170 will be piloted, allowing fluid communication between the output port in fluid communication with conduit 84, and thus lift bag 28, and exhaust ports 740, 741. As a result, fluid flows from conduit 84 and lift bag 28, venting or exhausting the lift bag through poppet assembly 170 and lowering lift axle/suspension system 10. Simultaneously, the control signal, or fluid flow, enters relay pilot inlet 759, generating a fluid pressure, or control pressure, in chamber 735 adjacent the pilot inlet. The control pressure within the portion of chamber 735 adjacent pilot inlet 759 acts on piston 324, overcoming the force of spring 316 and moving supply portion 312 away from supply seat 318. As a result, fluid flow from source of fluid pressure 106 moves through supply port 744 and supply inlet 765 past supply portion 312 into chamber 736 through the output port in fluid communication with air spring 15, inflating the air spring of the lowered lift axle/suspension assembly 11.

Thus, control apparatus 650, according to the present invention, provides secondary control module 700, having a simplified poppet assembly 170 that is optimized for a reduced number of components, thereby increasing reliability while reducing cost. Secondary control module 700, having poppet assembly 170 and relay valve assembly 310, is compatible with most heavy-duty vehicle lift axle/suspension applications while being relatively faster and more accurate than prior art systems, providing quicker retraction and extension of lift axle/suspension systems, such as lift axle/suspension system 10, and improved control over inflation of air spring 15. Secondary control module 700 with relay valve assembly 310 also provides reduced fluid consumption, reducing the wear on components of control apparatus 650, thereby reducing maintenance costs and downtime of the heavy-duty vehicle and increasing the service-life of the control apparatus.

It is to be understood that the structure and operation of control apparatus 50, 450, 650, according to the present invention, may be altered or rearranged, or certain components omitted or added, without affecting the overall concept or operation of the present invention. It is also to be understood that control apparatus 50, 450, 650 find application in all types of air-ride lift axle/suspension systems, including other types of lift axle/suspension systems than those shown and described herein, without affecting the concept or operation.

Accordingly, control apparatus 50, 450, 650, according to the present invention, are simplified; provide an effective, safe, inexpensive, and efficient structure and method, which achieve all the enumerated objectives; provide for eliminating difficulties encountered with prior art lift axle control systems; and solve problems and obtain new results in the art.

In the foregoing description, certain terms have been used for brevity, clarity, and understanding, but no unnecessary limitations are to be implied therefrom beyond the requirements of the prior art because such terms are used for descriptive purposes and are intended to be broadly construed. Moreover, the description and illustration of the invention is by way of example, and the scope of the invention is not limited to the exact details shown or described.

Having now described the features, discoveries, and principles of the invention; the manner in which the lift axle control system is used and installed; the characteristics of the construction, arrangement, and method steps; and the advantageous, new, and useful results obtained, the new and useful structures, devices, elements, arrangements, process, parts, and combinations are set forth in the appended claims.

What is claimed is:

1. A control apparatus for heavy-duty vehicle lift axle/suspension systems, said control apparatus comprising:
   a source of fluid pressure;
   a primary controller located remote from said lift axle/suspension system; and
   a secondary controller located proximate to the lift axle/suspension system and said source of fluid pressure and in fluid communication with said primary controller, the source of fluid pressure, and at least one lift bag and at least one air spring of the lift axle/suspension system, said secondary controller including:
   a pilot-operated poppet assembly; and
   a relay valve assembly;
   wherein the primary controller transmits at least a pneumatic pilot signal to the secondary controller in order to selectively inflate and deflate said at least one air spring and said at least one lift bag to selectively control and maintain the extension and retraction of the lift axle/suspension system; and
   wherein said relay valve assembly has at least one of a damping orifice or a threaded choke, said at least one of said damping orifice or said threaded choke providing restricted fluid communication to damp transient fluctuations in fluid pressure occurring during jounce and rebound events of said heavy-duty vehicle.

2. The control apparatus for heavy-duty vehicle lift axle/suspension systems of claim 1, said secondary controller further comprising a single module formed from one or more pieces and housing said pilot-operated poppet assembly and said relay valve assembly.

3. The control apparatus for heavy-duty vehicle lift axle/suspension systems of claim 1, said pilot-operated poppet assembly comprising at least one cartridge valve;
   wherein said at least one cartridge valve is disposed within a poppet module; and
   wherein said relay valve assembly is disposed within a separate relay module.

4. The control apparatus for heavy-duty vehicle lift axle/suspension systems of claim 3, wherein changing of said at least one cartridge valve disposed within said poppet module enables the switching of a default state of said lift axle/suspension system between extension and retraction.

5. The control apparatus for heavy-duty vehicle lift axle/suspension systems of claim 4, said poppet module being in fluid communication with and selectively controlling the inflation and deflation of said at least one lift bag; said relay module being in fluid communication with and selectively controlling the inflation and deflation of said at least one air spring.

6. The control apparatus for heavy-duty vehicle lift axle/suspension systems of claim 5, said poppet module being formed as a two-piece structure with an upper portion and a lower portion, said upper and lower portions being operatively engaged.

7. The control apparatus for heavy-duty vehicle lift axle/suspension systems of claim 5, said poppet module further comprising at least one chamber formed within the poppet module for housing said at least one cartridge valve; and
   at least one pilot port formed through the outer surface of the poppet module and providing fluid communication between said primary controller and the at least one cartridge valve.

8. The control apparatus for heavy-duty vehicle lift axle/suspension systems of claim 7, said poppet module further comprising an exhaust port, said exhaust port providing fluid communication between the atmosphere surrounding the poppet module and said at least one cartridge valve;
   an output port, said output port providing fluid communication between the at least one cartridge valve and said lift bag; and
   a supply port, said supply port providing fluid communication between said source of fluid pressure and the at least one cartridge valve.

9. The control apparatus for heavy-duty vehicle lift axle/suspension systems of claim 8, wherein the transmission of a pilot signal by said primary controller to said pilot port of said poppet module and said at least one cartridge valve selectively controls the inflation and deflation of said lift bag.

10. The control apparatus for heavy-duty vehicle lift axle/suspension systems of claim 6, said poppet module further comprising a first chamber and a second chamber formed in parallel within the poppet module for housing said at least one cartridge valve; and
    at least one pilot port formed through the outer surface of the poppet module and providing fluid communication between said primary controller and the at least one cartridge valve disposed within each of said first and second chambers.

11. The control apparatus for heavy-duty vehicle lift axle/suspension systems of claim 10, said poppet module further comprising a pair of exhaust ports, said pair of exhaust ports providing fluid communication between the atmosphere surrounding the poppet module and said at least one cartridge valve;
    a first output port and a second output port, said first output port providing fluid communication between the at least one cartridge valve and said lift bag, said second output port providing fluid communication between the at least one cartridge valve and said relay module; and
    a first supply port and a second supply port, said second supply port providing fluid communication between said source of fluid pressure and the at least one cartridge valve.

12. The control apparatus for heavy-duty vehicle lift axle/suspension systems of claim 11, said first supply port being in fluid communication between said primary controller and said at least one cartridge valve to provide a pneumatic regulating control signal to said secondary controller for establishing a particular fluid pressure within said air spring.

13. The control apparatus for heavy-duty vehicle lift axle/suspension systems of claim 11, said first supply port being in fluid communication between a height control valve and said at least one cartridge valve to provide a pneumatic regulating control signal to said secondary controller for establishing a particular fluid pressure within said air spring.

14. The control apparatus for heavy-duty vehicle lift axle/suspension systems of claim 5, said relay module including a first chamber and a second chamber, said first and second chambers being partially separated by a wall and interconnected by an opening formed in said wall; and
 a relay valve assembly at least partially disposed within and extending between said first and second chambers through said opening.

15. The control apparatus for heavy-duty vehicle lift axle/suspension systems of claim 14, said relay module further including a supply port in fluid communication with said source of fluid pressure and in selective fluid communication with said first chamber;
 a delivery port in fluid communication between the first chamber and said at least one air spring;
 an exhaust port in selective fluid communication with the first chamber; and
 a control port in fluid communication with said second chamber.

16. The control apparatus for heavy-duty vehicle lift axle/suspension systems of claim 15, said exhaust port being formed through the outer surface of said relay module across said second chamber from and aligned with said opening formed in said wall;
 said relay valve assembly being at least partially disposed within said exhaust port.

17. The control apparatus for heavy-duty vehicle lift axle/suspension systems of claim 16, said damping orifice or said threaded choke being disposed within said wall such that at least one of said damping orifice or said threaded choke provides restricted fluid communication between said first and second chambers to damp transient fluctuations in fluid pressure occurring during jounce and rebound events of said heavy-duty vehicle.

18. The control apparatus for heavy-duty vehicle lift axle/suspension systems of claim 17, said relay valve assembly including a supply portion selectively controlling fluid communication between said supply port and said delivery port; and
 an exhaust portion selectively controlling fluid communication between said delivery port and said exhaust port, said exhaust portion including a hollow stem extending at least through said first chamber and into said second chamber through said opening formed in said wall.

19. The control apparatus for heavy-duty vehicle lift axle/suspension systems of claim 18, said stem extending at least partially into and being at least partially slidably disposed within said exhaust port.

20. The control apparatus for heavy-duty vehicle lift axle/suspension systems of claim 19, said exhaust portion including a piston formed with and extending radially outward from said stem, said piston having a seal disposed about a perimeter of the piston and in contact with the inner surface of said second chamber to divide the second chamber.

21. The control apparatus for heavy-duty vehicle lift axle/suspension systems of claim 20, said piston including at least one of an equalization orifice, formed through the piston, or a second threaded choke, disposed in the piston, said at least one of said equalization orifice and said second threaded choke providing restricted fluid communication across the piston to prevent hysteresis and ensure that fluid flow through said delivery port precisely matches fluid flow transmitted into said control port.

22. The control apparatus for heavy-duty vehicle lift axle/suspension systems of claim 21, said damping orifice having a first inner diameter and said equalization orifice having a second inner diameter, said first inner diameter being greater than said second inner diameter.

23. The control apparatus for heavy-duty vehicle lift axle/suspension systems of claim 1, said secondary controller further comprising a first chamber and a second chamber, said first and second chambers being partially separated by a wall and interconnected by an opening formed in said wall, said relay valve assembly being at least partially disposed within and extending between the first chamber and the second chamber through said opening.

24. The control apparatus for heavy-duty vehicle lift axle/suspension systems of claim 23, said secondary controller further including a supply port in fluid communication with said source of fluid pressure and in selective fluid communication with said first chamber;
 a delivery port in fluid communication between the first chamber and said at least one air spring;
 an exhaust port in selective fluid communication with the first chamber; and
 a control port in fluid communication with said second chamber.

25. The control apparatus for heavy-duty vehicle lift axle/suspension systems of claim 24, said exhaust port being formed through the outer surface of said secondary controller across said second chamber from and aligned with said opening formed in said wall;
 said relay valve assembly being at least partially disposed within said exhaust port.

26. The control apparatus for heavy-duty vehicle lift axle/suspension systems of claim 25, said relay valve assembly including a supply portion selectively controlling fluid communication between said supply port and said delivery port; and
 an exhaust portion selectively controlling fluid communication between said delivery port and said exhaust port, said exhaust portion including a hollow stem extending at least through said first chamber and into said second chamber through said opening formed in said wall.

27. The control apparatus for heavy-duty vehicle lift axle/suspension systems of claim 26, said stem extending at least partially into and being at least partially slidably disposed within said exhaust port.

28. The control apparatus for heavy-duty vehicle lift axle/suspension systems of claim 27, said exhaust portion including a piston formed with and extending radially outward from said stem, said piston having a seal disposed about a perimeter of the piston and in contact with the inner surface of said second chamber to divide the second chamber.

29. The control apparatus for heavy-duty vehicle lift axle/suspension systems of claim 28, said piston including at least one of an equalization orifice, formed through the piston, or a second threaded choke, disposed in the piston, said at least one of said equalization orifice and said second threaded choke providing restricted fluid communication across the piston to prevent hysteresis and ensure that fluid flow through said delivery port precisely matches fluid flow transmitted into said control port.

30. The control apparatus for heavy-duty vehicle lift axle/suspension systems of claim 29, said damping orifice having a first inner diameter and said equalization orifice having a second inner diameter, said first inner diameter being greater than said second inner diameter.

31. A control apparatus for heavy-duty vehicle lift axle/suspension systems, said control apparatus comprising:
- a source of fluid pressure;
- a primary controller located remote from said lift axle/suspension system; and
- a secondary controller located proximate to the lift axle/suspension system and said source of fluid pressure and in fluid communication with said primary controller, the source of fluid pressure, and at least one lift bag and at least one air spring of the lift axle/suspension system, said secondary controller including:
- a pilot-operated poppet assembly, said poppet assembly comprising at least one cartridge valve, said at least one cartridge valve being disposed within a poppet module; and
- a relay valve assembly, said relay valve assembly being disposed within a separate relay module;
- wherein the primary controller transmits at least a pneumatic pilot signal to the secondary controller in order to selectively inflate and deflate said at least one air spring and said at least one lift bag to selectively control and maintain the extension and retraction of the lift axle/suspension system.

32. The control apparatus for heavy-duty vehicle lift axle/suspension systems of claim 31, wherein changing of said at least one cartridge valve disposed within said poppet module enables the switching of a default state of said lift axle/suspension system between extension and retraction.

33. The control apparatus for heavy-duty vehicle lift axle/suspension systems of claim 32, said poppet module being in fluid communication with and selectively controlling the inflation and deflation of said at least one lift bag;
- said relay module being in fluid communication with and selectively controlling the inflation and deflation of said at least one air spring.

34. The control apparatus for heavy-duty vehicle lift axle/suspension systems of claim 33, said poppet module being formed as a two-piece structure with an upper portion and a lower portion, said upper and lower portions being operatively engaged.

35. The control apparatus for heavy-duty vehicle lift axle/suspension systems of claim 33, said poppet module further comprising at least one chamber formed within the poppet module for housing said at least one cartridge valve; and
- at least one pilot port formed through the outer surface of the poppet module and providing fluid communication between said primary controller and the at least one cartridge valve.

36. The control apparatus for heavy-duty vehicle lift axle/suspension systems of claim 35, said poppet module further comprising an exhaust port, said exhaust port providing fluid communication between the atmosphere surrounding the poppet module and said at least one cartridge valve;
- an output port, said output port providing fluid communication between the at least one cartridge valve and said lift bag; and
- a supply port, said supply port providing fluid communication between said source of fluid pressure and the at least one cartridge valve.

37. The control apparatus for heavy-duty vehicle lift axle/suspension systems of claim 36, wherein the transmission of a pilot signal by said primary controller to said pilot port of said poppet module and said at least one cartridge valve selectively controls the inflation and deflation of said lift bag.

38. The control apparatus for heavy-duty vehicle lift axle/suspension systems of claim 34, said poppet module further comprising a first chamber and a second chamber formed in parallel within the poppet module for housing said at least one cartridge valve; and
- at least one pilot port formed through the outer surface of the poppet module and providing fluid communication between said primary controller and the at least one cartridge valve disposed within each of said first and second chambers.

39. The control apparatus for heavy-duty vehicle lift axle/suspension systems of claim 38, said poppet module further comprising a pair of exhaust ports, said pair of exhaust ports providing fluid communication between the atmosphere surrounding the poppet module and said at least one cartridge valve;
- a first output port and a second output port, said first output port providing fluid communication between the at least one cartridge valve and said lift bag, said second output port providing fluid communication between the at least one cartridge valve and said relay module; and
- a first supply port and a second supply port, said second supply port providing fluid communication between said source of fluid pressure and the at least one cartridge valve.

40. The control apparatus for heavy-duty vehicle lift axle/suspension systems of claim 39, said first supply port being in fluid communication between said primary controller and said at least one cartridge valve to provide a pneumatic regulating control signal to said secondary controller for establishing a particular fluid pressure within said air spring.

41. The control apparatus for heavy-duty vehicle lift axle/suspension systems of claim 39, said first supply port being in fluid communication between a height control valve and said at least one cartridge valve to provide a pneumatic regulating control signal to said secondary controller for establishing a particular fluid pressure within said air spring.

42. The control apparatus for heavy-duty vehicle lift axle/suspension systems of claim 33, said relay module including a first chamber and a second chamber, said first and second chambers being partially separated by a wall and interconnected by an opening formed in said wall; and
- a relay valve assembly at least partially disposed within and extending between said first and second chambers through said opening.

43. The control apparatus for heavy-duty vehicle lift axle/suspension systems of claim 42, said relay module further including a supply port in fluid communication with said source of fluid pressure and in selective fluid communication with said first chamber;
- a delivery port in fluid communication between the first chamber and said at least one air spring;
- an exhaust port in selective fluid communication with the first chamber; and
- a control port in fluid communication with said second chamber.

44. The control apparatus for heavy-duty vehicle lift axle/suspension systems of claim 43, said exhaust port being formed through the outer surface of said relay module across said second chamber from and aligned with said opening formed in said wall;

said relay valve assembly being at least partially disposed within said exhaust port.

45. The control apparatus for heavy-duty vehicle lift axle/suspension systems of claim 44, said relay module further comprising at least one of a damping orifice formed through said wall or a threaded choke disposed within said wall, said at least one of said damping orifice or said threaded choke providing restricted fluid communication between said first and second chambers to damp transient fluctuations in fluid pressure occurring during jounce and rebound events of said heavy-duty vehicle.

46. The control apparatus for heavy-duty vehicle lift axle/suspension systems of claim 45, said relay valve assembly including a supply portion selectively controlling fluid communication between said supply port and said delivery port; and an exhaust portion selectively controlling fluid communication between said delivery port and said exhaust port, said exhaust portion including a hollow stem extending at least through said first chamber and into said second chamber through said opening formed in said wall.

47. The control apparatus for heavy-duty vehicle lift axle/suspension systems of claim 46, said stem extending at least partially into and being at least partially slidably disposed within said exhaust port.

48. The control apparatus for heavy-duty vehicle lift axle/suspension systems of claim 47, said exhaust portion including a piston formed with and extending radially outward from said stem, said piston having a seal disposed about a perimeter of the piston and in contact with the inner surface of said second chamber to divide the second chamber.

49. The control apparatus for heavy-duty vehicle lift axle/suspension systems of claim 48, said piston including at least one of an equalization orifice, formed through the piston, or a second threaded choke, disposed in the piston, said at least one of said equalization orifice and said threaded choke providing restricted fluid communication across the piston to prevent hysteresis and ensure that fluid flow through said delivery port precisely matches fluid flow transmitted into said control port.

50. The control apparatus for heavy-duty vehicle lift axle/suspension systems of claim 49, said damping orifice having a first inner diameter and said equalization orifice having a second inner diameter, said first inner diameter being greater than said second inner diameter.

\* \* \* \* \*